(12) United States Patent
Taylor et al.

(10) Patent No.: US 12,306,791 B2
(45) Date of Patent: May 20, 2025

(54) TECHNIQUES FOR CREATING IDENTICAL SNAPSHOTS OF REPLICATED VOLUMES

(71) Applicant: Dell Products L.P., Hopkinton, MA (US)

(72) Inventors: Alan L. Taylor, Cary, NC (US); Nagapraveen Veeravenkata Seela, Cary, NC (US); Girish Sheelvant, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/486,547

(22) Filed: Oct. 13, 2023

(65) Prior Publication Data

US 2025/0123996 A1 Apr. 17, 2025

(51) Int. Cl.
*G06F 16/27* (2019.01)
*G06F 16/11* (2019.01)

(52) U.S. Cl.
CPC .................... *G06F 16/128* (2019.01)

(58) Field of Classification Search
CPC .................................... G06F 16/128
See application file for complete search history.

(56) References Cited

U.S. PATENT DOCUMENTS

2021/0263649 A1* 8/2021 Chen ............... G06F 3/0665

OTHER PUBLICATIONS

Dell EMC SRDF Introduction, Sep. 2019.*
U.S. Appl. No. 18/486,547, filed Oct. 13, 2023, entitled Techniques for User Snapshot Orchestration During Asynchronous Replication, Alan L. Taylor, et al.
U.S. Appl. No. 18/142,224, filed May 2, 2023, entitled Techniques for Adding and Removing Storage Objects From Groups, Dmitry Nikolayevich Tylik, et al.

* cited by examiner

*Primary Examiner* — Apu M Mofiz
*Assistant Examiner* — Cindy Nguyen
(74) *Attorney, Agent, or Firm* — Muirhead and Saturnelli, LLC

(57) ABSTRACT

In at least one embodiment, processing can include: receiving a request to create identical snapshots of volumes V1 and V2 configured as a stretched volume; and in response to receiving the request, performing first processing including: holding write acknowledgements for the stretched volume; tracking writes to the stretched volume; creating a first snapshot of V1 on a first system and a second snapshot of V2 on a second system; stopping tracking of writes to the stretched volume; resuming write acknowledgements for the stretched volume; determining tracked writes for the stretched volume; determining a set of locations corresponding to the tracked writes; selecting the first snapshot of V1 as a master copy; determining data changes corresponding the set of locations from the master copy; replicating the data changes from the first system to the second system including the second system; and applying the data changes to the second snapshot of V2.

19 Claims, 11 Drawing Sheets

500 ─┐

502 ─┤ Configure a replication configuration for a stretched volume LUN A from a volume pair (V1, V2), where V1 is on site A and V2 is on site B, and where V1 and V2 are configured to have the same identity as LUN A when presented to an external storage client such as a host. Additionally, an active replication session is established for the stretched volume based on the replication configuration. In at least one embodiment, the replication configuration can be any of: one way asynchronous replication with site A as the active or source site and site B as the passive or destination site; one way synchronous replication with site A as the active or source site and site B as the passive or destination site; or a metro configuration with two way synchronous replication. With one way replication configurations, the host can issue I/Os to the stretched volume or LUN over paths to the active or source site, and where the host cannot issue I/Os to the stretched volume or LUN over paths to destination or passive site. With the metro configuration, the host can issue I/Os to the stretched volume over paths to both sites A and B.

504 ─┤ An instruction, command or request to create identical snapshots of V1 and V2 can be received by the control path (CP) of site A. Site A receiving the request to create the identical snapshots can control, coordinate and drive processing to create the identical snapshot of V1 and V2. The create identical snapshot request can identify the particular stretched volume for which identical snapshots are requested from the stretched volume's volume pair (V1, V2).

506 ─┤ LSO of site A can coordinate holding write I/O completion or acknowledgements for writes directed to the stretched volume across the sites A and B.

If the replication configuration of the stretched volume is a one way replication configurations such as where site A is the active site, write I/O acknowledgements for the stretched volume only need to be held on the active site A since the host cannot issue write I/Os to site B that are directed to the stretched volume.

If the replication configuration of the stretched volume is a metro configuration with two way synchronous replication, write I/O acknowledgements for the stretched volume are held or paused on both sites A and B. Holding such write I/O completions guarantees a crash consistent image across V1 and V2 configured as the stretched volume. For the metro configuration, site A can coordinate holding or pausing write I/O acknowledgements directed to the stretched volume. In particular in at least one embodiment, site A can withhold or pause sending write I/O acknowledgements directed to the stretched volume; site A can send a request to site B to withhold or pause  sending write I/O acknowledgement directed to the stretched volume; site B can pause or withhold write I/O acknowledgements directed to the stretched volume; and site B can return an acknowledgement to site A indicating or confirming that site B has implemented the request to withhold write I/O acknowledgements for writes directed to the stretched volume.

FIG. 7A

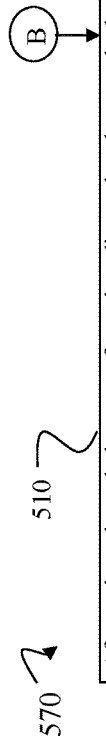

570

510

After write acknowledgements for writes directed to the stretched volume are withheld or paused across one or both sites based on the replication configuration and also after write I/O tagging is commenced across one or both sites based on the replication configuration, processing can be performed to commence write tracking for write I/Os directed to the stretched volume and also to create or take snapshots of V1 and V2 corresponding to the stretched volume. In at least one embodiment for one way replication configurations where A is the active site, write I/O tagging for the stretched volume need only be performed on site A. For a metro configuration, write I/O tagging of writes directed to the stretched volume is performed on both sites A and B.

Site A can commence tracking write I/Os with ID1 directed to the stretched volume and thus V1. Site A can also take or create V1 snap 404b, the snapshot of V1. In at least one embodiment, creating the snapshot of V1 and commencing/starting to track write I/Os with ID1 for V1 can be performed atomically as a single operation at the cache level by Txcache 406 within site A since the cache (e.g., Txcache 406) is tracking the writes with ID1.

Once site A has taken its snapshot of V1 and commenced tracking write I/Os with ID1, site A can send a request to site B. In at least one embodiment for one way replication configurations where site A is the active site, the request can be for site B to create a snapshot of V2. For a metro configuration, the request can be for site B to commence write I/O tracking for the stretched volume and also to take a snapshot of V2. In at least one embodiment for a metro configuration, creating the snapshot of V2, V2 snap 424b, and commencing/starting to track write I/Os with ID2 for V2 can be performed atomically as a single operation at the cache level by Txcache 426 within site B since the cache (e.g., Txcache 426) is tracking the writes with ID2.

Once site B has completed the requested processing of taking the snapshot of V2 and, for metro configurations also commencing write tracking for the stretched volume, site B can return an acknowledgement to site A confirming that the snapshot of V2 has been created.

512

After snapshots of V1 and V2 are taken or created, tracking of writes directed to the stretched volume can stop.

For one way replication configurations with site A as the active site such that write tracking was only commenced for site A, write tracking for the stretched volume only needs to be stopped on site A.

For a metro configuration, write tracking for the stretched volume is stopped on both sites A and B. Site A can 1) stop tracking writes tagged with ID1 directed to the stretched volume (and thus V1); and 2) send a request to site B to stop tracking writes directed to the stretched volume. In response to receiving the request to stop tracking writes, site B can 1) stop tracking writes tagged with ID2 directed to the stretched volume (and thus V2); and 2) send an acknowledgement to site A that site B has stopped tracking writes for the stretched volume.

514 — After tracking of writes directed to the stretched volume is stopped on one or both sites based on the replication configuration, processing can be performed to resume acknowledging host writes directed to the stretched volume.

For a one way replication configuration with site A as the active site, resuming such write acknowledgements only needs to be restarted or resumed on site A.

For a metro configuration, resuming such write acknowledgements is performed on both sites A and B. Site A can 1) resume returning to hosts acknowledgement of writes directed to the stretched volume (and thus V1); and 2) send a request to site B to also resume returning acknowledgements for writes directed to the stretched volume (and thus V1). In response to receiving the request to resume write acknowledgements, site B can 1) resume returning acknowledgements for writes tagged with ID2 directed to the stretched volume (and thus V2); and 2) send an acknowledgement to site A that site B has resumed acknowledgement of writes for the stretched volume.

516 — After resuming acknowledgement of writes directed to the stretched volume, determine a set of tracked write I/Os tracked for the stretched volume. The set denotes the tracked writes of the stretched volume that occurred during the time period while creating or taking the snapshots of V1 and V2 in the step 510.

For one way replication configurations, the set of tracked writes are those tracked by the active site such as site A.

For a metro configuration, the set of tracked writes are those tracked by both sites A and B. In at least one embodiment, site A (that received the request to create identical snapshots) can obtain the tracked writes from site A, obtain the tracked writes from site B, and determine the set of tracked writes by aggregating or combining the tracked writes from both sites A and B.

518 — A set of locations or LBAs corresponding to the target locations written to by the set of tracked writes can be determined. In at least one embodiment, the locations or LBAs of the tracked writes can be included in metadata or information recorded for the tracked writes by the caching layers, such as Txcache 406, 426.

FIG 7D

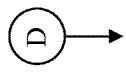

520 — One of the created snapshots, V1 snap 404b or V2 snap 424b, is selected as a master copy to be used for synchronizing content of the snapshots 404b, 424b corresponding to the set of locations or LBAs of the target locations written to by the set of tracked writes. In at least one embodiment, snap 404b can be selected as the master copy. The data or content located at the set of locations or LBAs can form the data changes replicated to the remote site B and applied to V2 snap 424b to thereby result in snapshots 404b and 424b now being identical.

Processing can include obtaining the data changes by reading content for the set of LBAs from the selected master copy snapshot 404b, replicating the data changes from site A to site B, and applying the data changes at corresponding LBAs to the snapshot 424b.

For example, assume the set or locations or LBAs written to by the set of tracked writes is 1, 5 and 10; and that V1 snap 404b is selected as the master copy. Site A can read content for LBAs 1, 5 and 10 from V1 snap 404b where such content for LBAs 1, 5 and 10 form the data changes. The data changes can be replicated from site A to site B, and then applied by site B to corresponding LBAs 1, 5 and 10 of V2 snap 424b.

522 — Once the data changes corresponding to the set of locations written to by the set of tracked writes have been applied to V2 snap 424b, V1 snap 404b and V2 snap 424b are identical snapshots.

524 — LSO of site A can return the newly created set of identical snapshots 404b, 424b to the CP of site A for further processing and use.

FIG 7E

TECHNIQUES FOR CREATING IDENTICAL SNAPSHOTS OF REPLICATED VOLUMES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: configuring a replication configuration including a first volume V1 of a first system and a second volume V2 of a second system, wherein V1 and V2 are configured as a stretched volume having a same identity when exposed to a host over paths from the first system and the second system; establishing an active replication session for the stretched volume between V1 and V2 in accordance with the replication configuration; sending first writes directed to the stretched volume from the host to one or more of the first system and the second system; receiving a request to create identical snapshots for V1 and V2; and in response to receiving the request, performing first processing including: holding write acknowledgements regarding completion of writes directed to the stretched volume; tracking writes directed to the stretched volume; creating a first snapshot of V1 and a second snapshot of V2; stopping tracking of writes directed to the stretched volume; resuming write acknowledgements regarding completion of writes directed to the stretched volume; determining, in accordance with said tracking, a set of tracked writes directed to the stretched volume; determining a set of locations corresponding to the set of tracked writes; selecting the first snapshot of V1 as a master copy; determining data changes corresponding the set of locations from the master copy; replicating the data changes from the first system to the second system; and applying the data changes to the second snapshot of V2.

In at least one embodiment, the set of tracked writes can denote writes directed to the stretched volume that are received at the first system and the second system during a time period when the first snapshot of V1 and the second snapshot of V2 are created. The replication configuration can be a one-way replication configuration, where writes directed to the stretched volume are sent over first paths from the host to the first system and automatically replicated to the second system, and where the host does not send I/Os directed to the stretched volume to the second system. The one-way replication configuration can provide for asynchronous replication of writes directed to the stretched volume from the first system to the second system. The one-way replication configuration can provide for synchronous replication of writes directed to the stretched volume from the first system to the second system.

In at least one embodiment, the replication configuration can be a two-way synchronous replication configuration, where writes directed to the stretched volume are sent over first paths from the host to the first system and automatically replicated to the second system, and where writes directed to the stretched volume are sent over second paths from the host to the second system and automatically replicated to the first system. Holding write acknowledgements regarding completion of writes directed to the stretched volume can include: the first system holding write acknowledgements regarding completion of writes directed to V1; and the second system holding write acknowledgements regarding completion of writes directed to V2. Tracking writes directed to the stretched volume can include: the first system tracking writes directed to V1; and the second system tracking writes directed to V2. Processing can include: the first system tagging writes directed to the stretched volume with a first identifier corresponding to the request, the stretched volume, V1 and the first snapshot of V1; and the second system tagging writes directed to the stretched volume with a second identifier corresponding to the request, the stretched volume, V2 and the second snapshot of V2. The first system can track writes directed to V1 by identifying writes tagged with the first identifier. The second system can track writes directed to V2 by identifying writes tagged with the second identifier. Stopping tracking of writes directed to the stretched volume can include: stopping tracking of writes directed to V1 on the first system; and stopping tracking of writes directed to V2 on the second system. Resuming write acknowledgements regarding completion of writes directed to the stretched volume can include: the first system resuming write acknowledgments regarding completion of writes directed to V1; and the second system resuming write acknowledgments regarding completion of writes directed to V2. Determining the set of tracked writes directed to the stretched volume can include: obtaining a first portion of tracked writes that are directed to the stretched volume and tracked by the first system; obtaining a second portion of tracked writes that are directed to the stretched volume and tracked by the second system; and combining the first portion and the second portion to determine an aggregated set of tracked writes as the set of tracked writes. The set of locations can include logical offsets or locations written to by the aggregated set of tracked writes.

In at least one embodiment, the first processing can be performed while the host sends the first writes directed to the stretched volume to any of the first system and the second system in accordance with replication configuration. The first processing can be performed while the first writes directed to the stretched volume are replicated between the first system and the second system in accordance with the replication configuration.

Various embodiments of the techniques herein can include a second computer-implemented method, a second system and a second non-transitory computer readable medium. The second system can include one or more processors, and a memory comprising code that, when executed, performs the second method. The second non-transitory computer readable medium can include code stored thereon that, when executed, performs the second method. The second method can comprise: configuring a replication configuration for a group of a plurality of stretched resources, wherein each of the plurality of stretched resources is configured from a pair of corresponding resources R1, R2, wherein R1 is a first local resource of a first system and R2 is a second local resource of a second system, wherein R1 and R2 have a same identity when exposed to a host over paths from the first system and the second system; establishing an active replication session for the group of stretched resources in accordance with the replication configuration; sending first writes directed to the plurality of stretched resources of the group, wherein the first writes are sent from the host to one or more of the first system and the second system; receiving a request to create identical snapshots for the group of the plurality of stretched resources; in response to receiving the request, performing first processing including: holding write acknowledgements regarding completion of writes directed to the plurality of stretched resources; tracking writes directed to the plurality of stretched resources; for each of the plurality of stretched resources configured from a corresponding first local resource of the first system and a corresponding second local resource of the second system, creating a first snapshot of the corresponding first local resource and a second snapshot of the corresponding second local resource; stopping tracking of writes directed to the plurality of stretched resources of the group; resuming write acknowledgements regarding completion of writes directed to the plurality of stretched resources of the group; determining, in accordance with said tracking, a set of tracked writes directed to the plurality of stretched resources of the group; determining a set of locations corresponding to the set of tracked writes; selecting the first snapshots of the corresponding first local resources of the first system corresponding to the plurality of stretched resources as a master copy of content; determining data changes corresponding the set of locations from the master copy; replicating the data changes from the first system to the second system; and applying the data changes to the second snapshots of the corresponding second local resources of the second system corresponding to the plurality of stretched resources.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7A-7E form a flowchart of processing steps that can be performed in at least one embodiment in accordance with the techniques of the present disclosure.

DETAILED DESCRIPTION OF EMBODIMENT(S)

Figure 1:
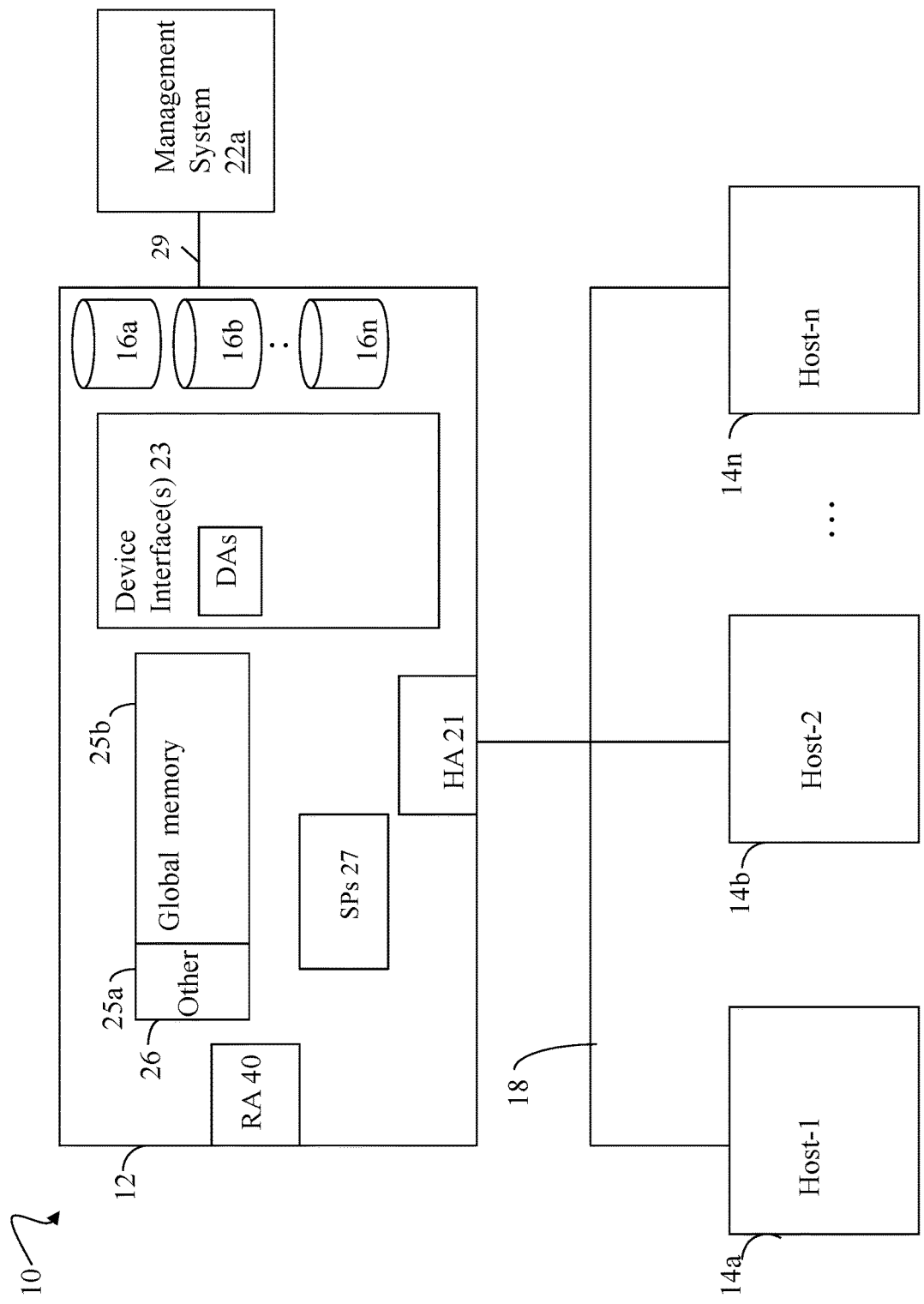
FIG. 1 is an example of components that can be included in a system in accordance with the techniques of the present disclosure.

Two data storage systems, sites or appliances, such as "site or system A" and "site or system B", can present a single data storage resource or object, such as a volume or logical device, to a client, such as a host. The volume can be configured as a stretched volume or resource where a first volume V1 on site A and a second volume V2 on site B are both configured to have the same identity from the perspective of the external host. The stretched volume can be exposed over paths going to both sites A and B.

In some systems, the stretched volume can be configured for one-way replication in either an asynchronous mode or a synchronous mode. When configured for one-way replication, a host or other client can issue I/Os, including writes, to only a single one of the systems or sites A and B, but not both. In some systems, the stretched volume can be included in a metro replication configuration (sometimes simply referred to as a metro configuration) where the host can issue I/Os, including writes, to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume.

Creating identical user snapshots of V1 and V2 comprising the configured stretched volume, respectively, on sites A and B is one of the features customers expect from a replication product. The customers can expect to be able to take identical snapshots of V1 and V2. Put another way, customers can expect a first snapshot (snap1) of V1, and a first snapshot (snap1) of V2 to be byte for byte identical when V1 and V2 are configured as a stretched LUN or volume for replication including any of asynchronous replication, synchronous replication, and metro replication.

One main challenge to solve is how to efficiently create snapshots of V1 and V2 that are identical while the host is continuing to send I/O and while the replication configuration session is active and ongoing continually replicating writes. The foregoing challenge, as well as others, can be further amplified for groups of volumes, and particularly, where there are groups of volumes in a metro replication configuration where hosts can read and write to both V1 and V2 of the stretched volume.

With a stretched volume configured from volumes V1 and V2, respectively, on the sites A and B, one technique that can be used to create identical snapshots of V1 and V2 includes quiescing and draining host I/O directed to V1 and V2. With a one way replication configuration where the hosts can only issue writes to a single one of the V1 of site A or V2 of site B, the foregoing quiescing and draining can be performed with respect to the single volume and site to which the host can issue writes, or more generally I/Os. Once new I/Os are temporarily stopped or paused by the quiescing and once any pending or in-progress I/Os are allowed to drain or complete, it can be guaranteed that no I/O is occurring and that V1 and V2 are identical in terms of content, such that at this point, snapshots of both V1 and V2 can be taken where such snapshots are identical. With a metro configuration having a two way synchronous replication configuration where the hosts can issue writes to both the V1 of site A and V2 of site B, the foregoing quiescing and draining can be performed with respect to both V1 of site A and V2 of site B. Once new I/Os are temporarily stopped or paused by the quiescing and once any pending or in-progress I/Os are allowed to drain or complete, it can be guaranteed that no I/O is occurring and that V1 and V2 are identical in terms of content, such that at this point, snapshots of both V1 and V2 can be taken where such snapshots are identical. Once the identical snapshots are V1 and V2 taken, I/Os can resume and additionally replication of any write I/Os can also resume in accordance with the particular replication configuration.

One of the drawbacks to the foregoing approach is that performing such quiescing and draining of host I/Os directed to the stretched volume causes additional latency of such host I/Os. Thus applications issuing the affected host I/Os can be adversely impacted by the additional I/O latency. Customers may expect to incur some additional acceptable latency in connection with replicating writes for the particular replication configuration. However, incurring additional I/O latency due to taking identical snapshots of V1 and V2 configured as a stretched volume can be unexpected and/or unacceptable, for example, due to the adverse impact on applications issuing such I/Os directed to the stretched volume.

Additionally, some systems support a volume group that can include multiple stretched volumes. For a group of volumes, identical snapshots can be taken of all V1 volumes in the group and all V2 volumes in the group. Using the foregoing approach, quiescing and draining I/Os prior to taking identical snapshots is performed for all volumes in the group yet further amplifying the adverse effects of increased I/O latency for all stretched volumes in the volume group.

To overcome the foregoing as well as other drawbacks, the techniques of the present disclosure can be used to efficiently take or create identical snapshots of volumes. The techniques of the present disclosure can be performed without the need to quiesce and drain I/Os directed to the volumes.

In at least one embodiment, the techniques of the present disclosure utilize a mechanism for write tracking of write I/Os in the data path where a cache or caching layer, such as a transactional caching layer, can track tagged write I/Os. In at least one embodiment, the cache or caching layer can track information about the tagged write I/Os, where the information can include a volume, offset and length corresponding to each tracked write I/O. The volume, offset and length can correspond to a target address or location of the write I/O to which data or content is written by the write I/O. At a later point in time in at least one embodiment, the information or metadata can be requested and collected for all tagged or tracked write I/Os. Processing can then include synchronizing the content of the locations of the tracked writes of V1 and V2 configured as the stretched volume.

In at least one embodiment, the foregoing tracking of write I/Os can be used in connection with the techniques of the present disclosure to provide a solution to create identical snapshots of volumes on sites or systems A and B without performing a quiesce and drain of I/Os directed to such volumes.

In at least one embodiment for a stretched volume configured from a volume pair V1, V2 where V1 is on the system A and V2 is on the system B, the caching layer on each system can track tagged write I/Os directed to the particular volume of the pair on the system. Prior to taking a first instance of snapshots of V1 and V2, write I/O completion or acknowledgements can be withheld temporarily by the data storage systems A and B even though the storage systems have completed servicing such write I/Os. After the write I/O acknowledgments are withheld on systems A and B, write I/Os directed to the stretched volume can be tagged with system-local tracking identifiers (IDs) (sometimes referred to herein simply as tracking IDs). In at least one embodiment, a unique tracking ID on a system can be specified for a combination of a particular identical snapshot request or command, a particular volume and a particular snapshot instance to be created of the particular volume. Thus within a data storage system in at least one embodiment, the tracking ID can be used to uniquely tag, identify and track write I/Os corresponding to a particular snapshot of a particular volume for a particular identical snapshot request or command.

In at least one embodiment, after write I/O acknowledgements are withheld across the systems A and B, processing can be performed to commence write I/O tracking and also take or create snap1 V1 (denoting a snapshot of V1) and snap1 V2 (denoting a snapshot of V2). The write I/O tracking performed captures the host write I/Os that are directed to the stretched volume and are received during the time period while the snapshots snap V1 and snap V2 are being created. In at least one embodiment, ID1 can denote the tracking ID corresponding to snap1 V1 on system A, and ID2 can denote the tracking ID corresponding to snap1 V2 on system B. In at least one embodiment, the system A can atomically perform the following operations or tasks: take snap1 V1 and commence write I/O tracking of write I/Os tagged with ID1. In at least one embodiment, the system B can atomically perform the following operations or tasks: take snap1 V2 and commence write I/O tracking of write I/Os tagged with ID2. In at least one embodiment, the foregoing operations can be performed atomically by each system so as to ensure capturing and tracking all host write I/Os received during the time period while the snapshots snap1 V1 and snap1 V2 are taken.

In at least one embodiment, after snap1 V1 and snap1 V2 are taken or created, write tracking of write I/Os directed to the stretched volume (e.g., V1 and V2) can stop. In particular, the system A can stop write I/O tracking of write I/Os tagged with ID1; and the system B can stop write I/O tracking of write I/Os tagged with ID2. At this point, the first version of the snapshots snap1 V1 and snap1 V2 can be incomplete and not yet identical.

In at least one embodiment, once write tracking is stopped, processing can be performed to collect information about the tracked write I/Os and determine a complete set of write I/Os that occurred during the time period while the snapshots snap1 V1 and snap1 V2 are being created. In connection with one-way replication configurations in at least one embodiment, the complete set of tracked write I/Os are those of the source system with respect to the replication configuration. The source system can be the single one of the systems A and B to which a host can issue I/Os directed to the stretched volume. In connection with a metro configuration in at least one embodiment, the complete set of tracked write I/Os includes tracked write I/Os from both the systems A and B since a host can issue I/Os directed to the stretched volume to both systems A and B.

In at least one embodiment, the operation to create the identical snapshots of V1 and V2 can be generally initiated from one of the systems A and B that can also drive or control the workflow processing. In at least one embodiment with a one-way replication configuration, the source system can initiate the operation to create the identical snapshots. In at least one embodiment with a metro configuration, either system A or B can initiate the operation to create the identical snapshots.

In at least one embodiment where the system A initiated the operation to create the identical snapshots of V1 and V2, the system A can collect the information or metadata regarding the complete set of tracked write I/Os to determine the particular offsets or locations of V1 corresponding to the tracked write I/Os. For example in at least one embodiment, the information or metadata of the complete set of tracked write I/Os can identify the logical block addresses or offsets (LBAs) modified or written to by the tracked write I/Os. The modified or written LBAs can denote the locations of the data changes extracted from snap1 V1, where such data changes are read from snap1 V1, replicated to system B, and applied or written to snap1 V2 on system B. For example, if the modified or written LBAs of the complete set of tracked write I/Os are 1, 5 and 20, content located at LBAs 1, 5 and 20 can be read from snap1 V1 of system A, replicated to system B, and then applied or written to snap1 V2 of system B.

In at least one embodiment, after the data changes corresponding to the tracked writes are replicated from system A to system B and applied to the snap1 V2, snap1 V1 and snap1 V2 are identical snapshots. The new set of identical snapshots snap1 V1 and snap1 V2 can now be further utilized. For example in at least one embodiment, if the request to create the identical snapshots is a user initiated request, the identical snapshots can be exposed externally to the user. As another example in at least one embodiment, if the request to create the identical snapshots is a data storage system internal request, the identical snapshots can be used for data storage system internal tasks or operations. For example, the data storage system internal request can be a request to create identical snapshots used as recovery snapshots to thereby provide a common base for subsequent use in any desired recovery operations. In at least one embodiment, recovery snapshots can be leveraged to determine the write operations that might not have been replicated at the time of any fault in the sites A and B, or in the replication network link therebetween. For example, assume an existing replication session fails or stops because site B was unavailable and site A continued to service storage clients using its V1 copy of the stretched volume. At a later point in time, site B is again available and online. As part of re-establishing the replication session, V2 of site B needs to be synchronized with V1 of site A. Prior to site B going offline, identical recovery snapshots of V1 and V2 (e.g., snap1 V1 and snap1 V2) may have been created as part of a schedule of periodically taking identical recovery snapshots of V1 and V2 in an ongoing manner. Now when site B comes back online at a second point in time, a second snapshot of V1, snap2 V1, can be taken. A snapshot difference between the two snapshots, snap1 V1 and snap2 V1, of site A can be used to synchronize the missing writes of V2 on site B which was unavailable or offline due to a fault causing the replication failure. Put another way, the snapshot difference between snap1 V1 and snap2 V1 denotes the missing writes to be applied to V2 of site B, where the missing writes are those that occurred during the time when site B was unavailable.

In at least one embodiment, a stretched volume can generally denote a single stretched storage resource or object configured from two local storage resources, objects or copies, respectively, on the two different sites or storage systems A and B, where the local two storage resources are configured to have the same identity as presented to a host or other external client. Sometimes, a stretched volume can also be referred to herein as a metro volume. More generally, sometimes a stretched storage resource or object can be referred to herein as a metro storage object or resource.

In at least one embodiment, a stretched resource or object can be any one of a set of defined resource types including one or more of: a volume, a logical device; a file; a file system; a sub-volume portion; a virtual volume used by a virtual machine; a portion of a virtual volume used by a virtual machine; a portion of a file system; a directory of files; and/or a portion of a directory of files. Thus although the techniques of the present disclosure can be described herein with reference to stretched volumes or logical devices, the techniques of the present disclosure can more generally be applied for use in connection with any suitable stretched resource or object.

In at least one embodiment, a storage object group or resource group construct can also be utilized where the group can denote a logically defined grouping of one or more storage objects or resources. In particular, a stretched or metro volume group can denote a logically defined grouping of one or more stretched volumes. More generally, a stretched or metro storage resource group or object group can denote a logically defined grouping of one or more stretched objects or resources.

The foregoing group construct of resources or objects can be used for any suitable purpose depending on the particular functionality and services supported for the group. For example in at least one embodiment, data protection can be supported at the group level such as in connection with snapshots. Taking a snapshot of the group can include taking a snapshot of each of the members at the same point in time. The group level snapshot can provide for taking a snapshot of all group members and providing for write order consistency among all snapshots of group members.

An application executed on a host can use such group constructs to create consistent write-ordered snapshots across all volumes, storage resources or storage objects in the group. Applications that require disaster tolerance can use the metro configuration with a volume group to have higher availability. Consistent with other discussion herein, such a volume group of metro or stretched volumes can sometimes be referred to as a metro volume group or metro group.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
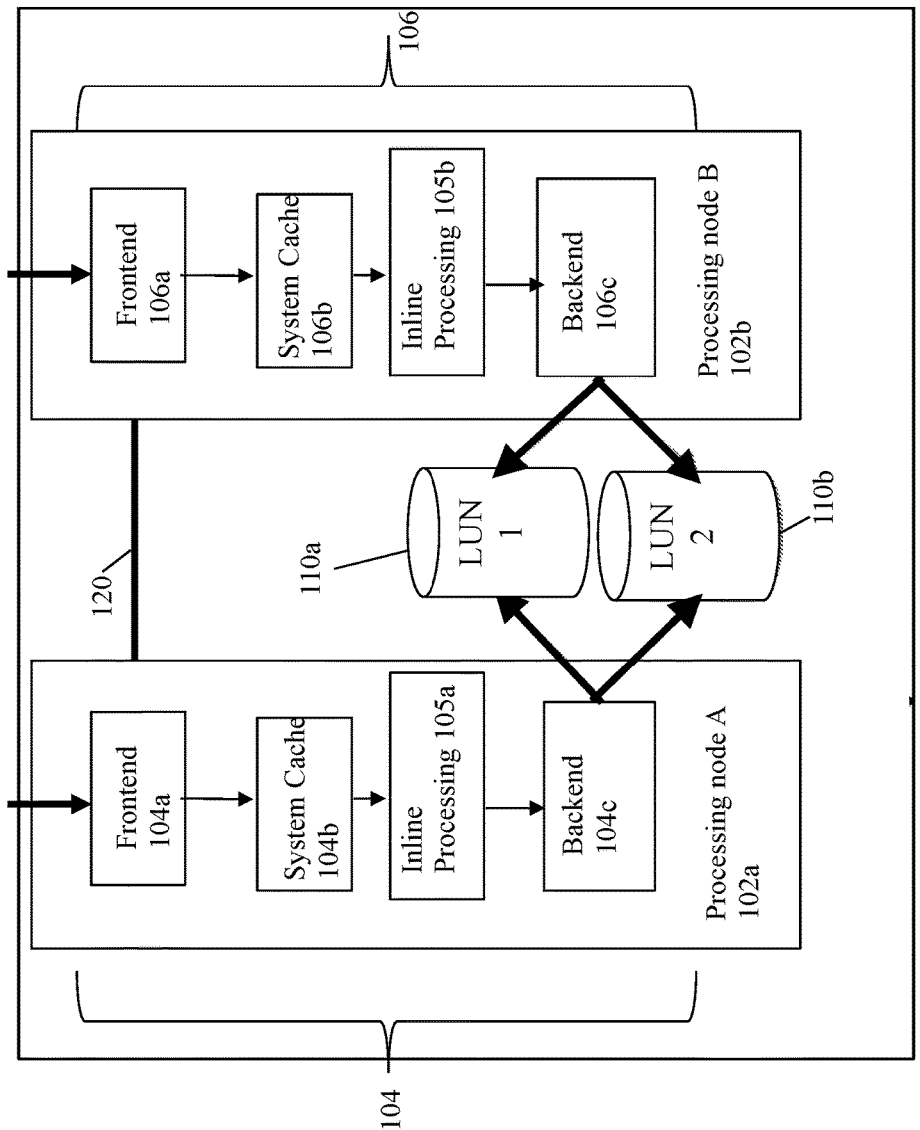
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a synchronous mode described elsewhere herein.

Figure 3:
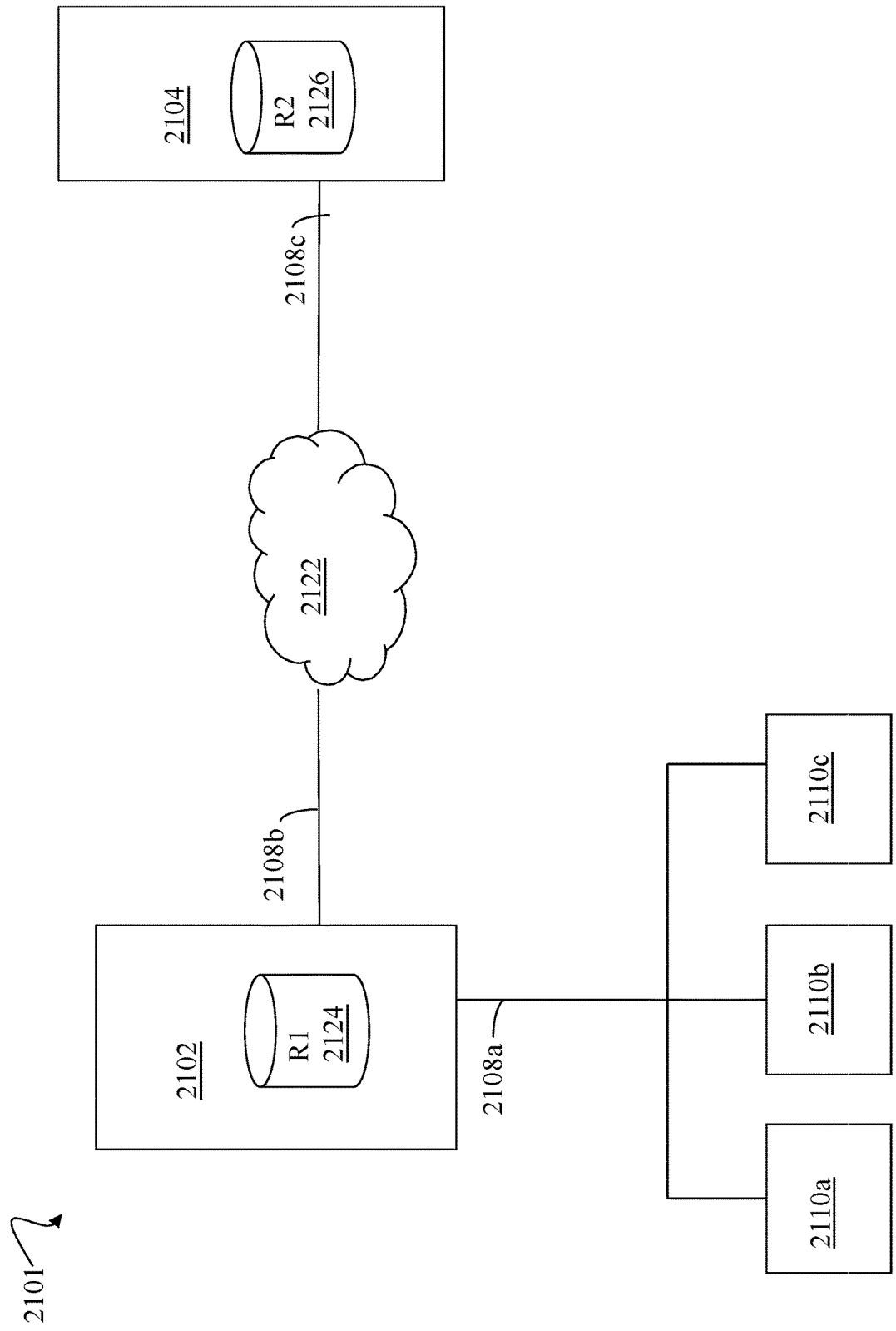
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can issue I/Os and other operations, commands, or requests to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 2104 can be characterized as remote with respect to the hosts 2110a, 2110b and 2110c. The R1 and R2 devices can be configured as LUNs.

The host 2110a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 2110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With synchronous mode remote data replication in at least one embodiment, a host 2110a can issue a write to the R1 device 2124. The primary or R1 data storage system 2102 can store the write data in its cache at a cache location and mark the cache location as including write pending (WP) data as mentioned elsewhere herein. At a later point in time, the write data is destaged from the cache of the R1 system 2102 to physical storage provisioned for the R1 device 2124 configured as the LUN A. Additionally, the RRF operating in the synchronous mode can propagate the write data across an established connection or link (more generally referred to as a the remote replication link or link) such as over 2108b, 2122, and 2108c, to the secondary or R2 data storage system 2104 where the write data is stored in the cache of the system 2104 at a cache location that is marked as WP. Subsequently, the write data is destaged from the cache of the R2 system 2104 to physical storage provisioned for the R2 device 2126 configured as the LUN A. Once the write data is stored in the cache of the system 2104 as described, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. Thus, generally, R1 device 2124 and R2 device 2126 can be logical devices, such as LUNs, configured as synchronized data mirrors of one another. R1 and R2 devices can be, for example, fully provisioned LUNs, such as thick LUNs, or can be LUNs that are thin or virtually provisioned logical devices.

Figure 4:
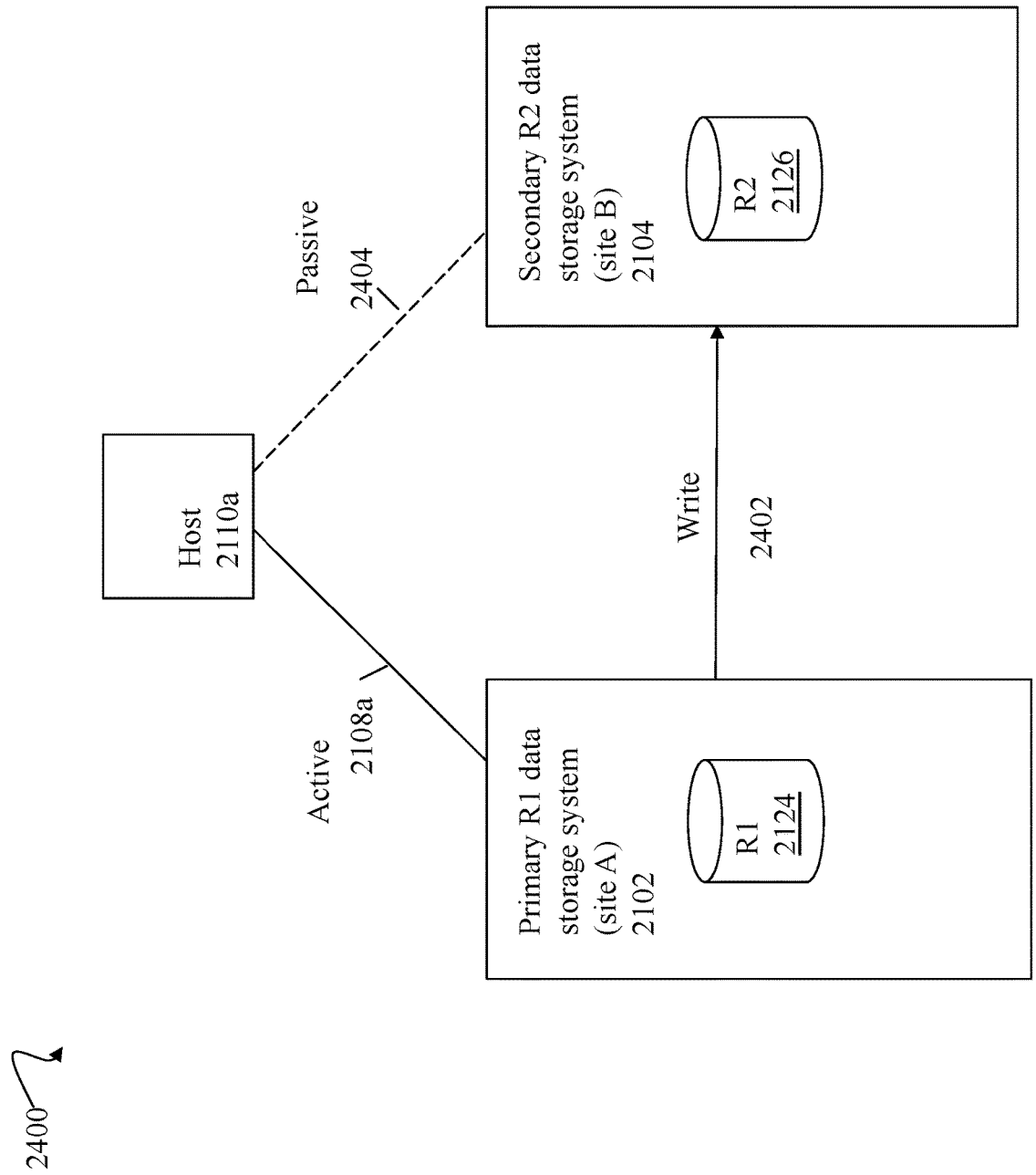
FIG. 4 is an example illustrating an active-passive replication configuration of a stretched volume using one-way synchronous replication in at least one embodiment.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration with synchronous replication performed from the R1 data storage system 2102 to the secondary R2 system 2104. With the active-passive configuration of FIG. 4, the host 2110a has an active connection or path 2108a over which all I/Os are issued to only the R1 data storage system. The host 2110a can have a passive connection or path 2404 to the R2 data storage system 2104. Writes issued over path 2108a to the R1 system 2102 can be synchronously replicated to the R2 system 2104.

In the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued whereby the host is not permitted to access the LUN A over path 2404). For example, in a SCSI-based environment, the devices 2124 and 2126 can be configured to have the same logical device identifier such as the same world-wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links can be used in connection with replicating data from systems 2102 to system 2104.

Figure 5:
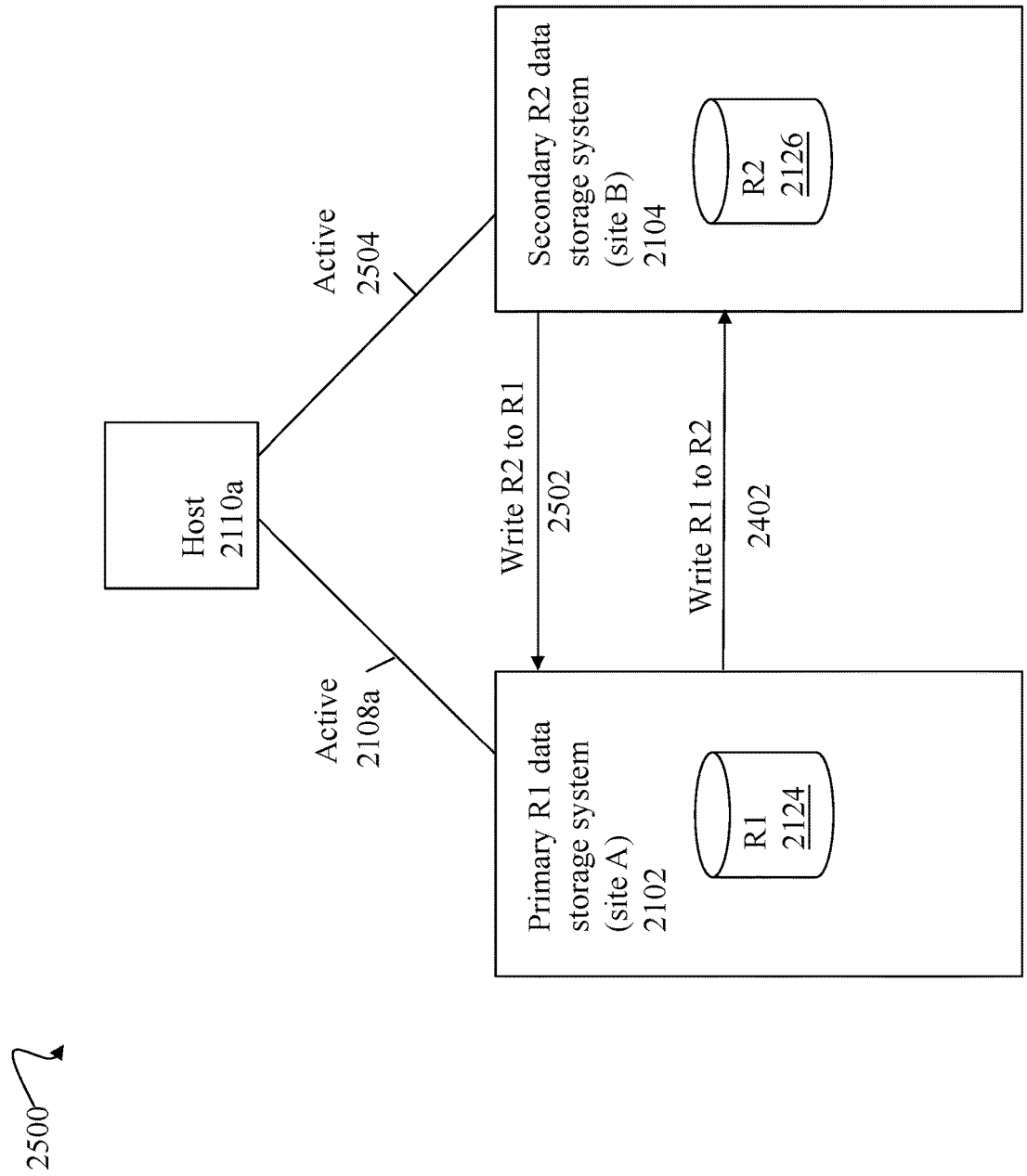
FIG. 5 is an example illustrating an active-active replication configuration of a stretched volume using two-way or bidirectional synchronous replication in at least one embodiment in accordance with the techniques of the present disclosure.

Referring to FIG. 5, shown is an example configuration of components that can be used in an embodiment. The example 2500 illustrates an active-active configuration as can be used in connection with synchronous replication in at least one embodiment. In the active-active configuration or state with synchronous replication, the host 2110a can have a first active path 2108a to the R1 data storage system and R1 device 2124 configured as LUN A. Additionally, the host 2110a can have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration can issue I/Os, both reads and/or writes, over both of the paths 2108a and 2504 at the same time.

In at least one embodiment in a replication configuration of FIG. 5 with an active-active configuration where writes can be received by both systems or sites 2124 and 2126, a predetermined or designated one of the systems or sites 2124 and 2126 can be assigned as the preferred system or site, with the other remaining system or site assigned as the non-preferred system or site. In such an embodiment with a configuration as in FIG. 5, assume for purposes of illustration that system or site R1/A is preferred and the system or site R2/B is the non-preferred.

The host 2110a can send a first write over the path 2108a which is received by the preferred R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The first write request can be directly received by the preferred system or site R1 2102 from the host 2110a as noted above. Alternatively in a configuration of FIG. 5 in at least one embodiment, a write request, such as the second write request discussed below, can be initially received by the non-preferred system or site R2 2104 and then forwarded to the preferred system or site 2102 for servicing. In this manner in at least one embodiment, the preferred system or site R1 2102 can always commit the write locally before the same write is committed by the non-preferred system or site R2 2104. In particular, the host 2110a can send the second write over the path 2504 which is received by the R2 system 2104. The second write can be forwarded, from the R2 system 2104 to the R1 system 2102, over the link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the preferred R1 system 2102 (e.g., indicating that the second write is committed by the R1 system 2102), the R1 system 2102 sends an acknowledgement over the link 2502 to the R2 system 2104 where the acknowledgment indicates that the preferred R1 system 2102 has locally committed or locally completed the second write on the R1 system 2102. Once the R2 system 2104 receives the acknowledgement from the R1 system, the R2 system 2104 performs processing to locally complete or commit the second write on the R2 system 2104. In at least one embodiment, committing or completing the second write on the non-preferred R2 system 2104 can include the second write being written to the cache of the R2 system 2104 where, at a later point in time, the second write is destaged from the cache of the R2 system 2104 to physical storage provisioned for the R2 device 2126 configured as the LUN A. Once the second write is written to the cache of the R2 system 2104, the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110a unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that FIG. 5 illustrates a configuration with only a single host connected to both systems 2102, 2104 of the metro cluster. More generally, a configuration such as illustrated in FIG. 5 can include multiple hosts where one or more of the hosts are connected to both systems 2102, 2104 and/or one or more of the hosts are connected to only a single of the systems 2102, 2104.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host 2110a by having each volume or device of the device pair (R1 device 2124, R2 device 2126) configured and presented to the host 2110a as the same volume or LUN A. Additionally, the stretched LUN A is configured for two way synchronous remote replication between the systems 2102 and 2104 respectively including the two devices or volumes of the device pair, (R1 device 2124, R2 device 2126).

In the following paragraphs, sometimes the configuration of FIG. 5 can be referred to as a metro configuration or a metro replication configuration. The configurations of FIGS. 4 and 5 include two data storage systems 2102 and 2104 which can more generally be referred to as sites. In the following paragraphs, the two systems or sites 2102 and 2104 can be referred to respectively as site A and site B.

Consistent with discussion above, two data storage systems, sites or appliances, such as "site or system A" and "site or system B", can present a single data storage resource or object, such as a volume or logical device, to a client, such as a host. The volume can be configured as a stretched volume or resource where a first volume V1 on site A and a second volume V2 on site B are both configured to have the same identity from the perspective of the external host. The stretched volume can be exposed over paths going to both sites A and B.

In some systems, the stretched volume can be configured for one-way replication in either an asynchronous mode or a synchronous mode. When configured for one-way replication, a host or other client can issue I/Os, including writes, to only a single one of the systems or sites A and B, but not both. In some systems, the stretched volume can be included in a metro replication configuration (sometimes simply referred to as a metro configuration) where the host can issue I/Os, including writes, to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume.

Creating identical user snapshots of V1 and V2 comprising the configured stretched volume, respectively, on sites A and B is one of the features customers expect from a replication product. The customers can expect to be able to take identical snapshots of V1 and V2. Put another way, customers can expect a first snapshot (snap1) of V1, and a first snapshot (snap1) of V2 to be byte for byte identical when V1 and V2 are configured as a stretched LUN or volume for replication including any of asynchronous replication, synchronous replication, and metro replication.

One main challenge to solve is how to efficiently create snapshots of V1 and V2 that are identical while the host is continuing to send I/O and while the replication configuration session is active and ongoing continually replicating writes. The foregoing challenge, as well as others, can be further amplified for groups of volumes, and particularly, where there are groups of volumes in a metro replication configuration where hosts can read and write to both V1 and V2 of the stretched volume.

With a stretched volume configured from volumes V1 and V2, respectively, on the sites A and B, one technique that can be used to create identical snapshots of V1 and V2 includes quiescing and draining host I/O directed to V1 and V2. With a one way replication configuration where the hosts can only issue writes to a single one of the V1 of site A or V2 of site B, the foregoing quiescing and draining can be performed with respect to the single volume and site to which the host can issue writes, or more generally I/Os. Once new I/Os are temporarily stopped or paused by the quiescing and once any pending or in-progress I/Os are allowed to drain or complete, it can be guaranteed that no I/O is occurring and that V1 and V2 are identical in terms of content, such that at this point, snapshots of both V1 and V2 can be taken where such snapshots are identical. With a metro configuration having a two way synchronous replication configuration where the hosts can issue writes to both the V1 of site A and V2 of site B, the foregoing quiescing and draining can be performed with respect to both V1 of site A and V2 of site B. Once new I/Os are temporarily stopped or paused by the quiescing and once any pending or in-progress I/Os are allowed to drain or complete, it can be guaranteed that no I/O is occurring and that V1 and V2 are identical in terms of content, such that at this point, snapshots of both V1 and V2 can be taken where such snapshots are identical. Once the identical snapshots are V1 and V2 taken, I/Os can resume and additionally replication of any write I/Os can also resume in accordance with the particular replication configuration.

One of the drawbacks to the foregoing approach is that performing such quiescing and draining of host I/Os directed to the stretched volume causes additional latency of such host I/Os. Thus applications issuing the affected host I/Os can be adversely impacted by the additional I/O latency. Customers may expect to incur some additional acceptable latency in connection with replicating writes for the particular replication configuration. However, incurring additional I/O latency due to taking identical snapshots of V1 and V2 configured as a stretched volume can be unexpected and/or unacceptable, for example, due to the adverse impact on applications issuing such I/Os directed to the stretched volume.

Additionally, some systems support a volume group that can include multiple stretched volumes. For a group of volumes, identical snapshots can be taken of all V1 volumes in the group and all V2 volumes in the group. Using the foregoing approach, quiescing and draining I/Os prior to taking identical snapshots is performed for all volumes in the group yet further amplifying the adverse effects of increased I/O latency for all stretched volumes in the volume group.

To overcome the foregoing as well as other drawbacks, the techniques of the present disclosure can be used to efficiently take or create identical snapshots of volumes. The techniques of the present disclosure can be performed without the need to quiesce and drain I/Os directed to the volumes.

In at least one embodiment, the techniques of the present disclosure utilize a mechanism for write tracking of write I/Os in the data path where a cache or caching layer, such as a transactional caching layer, can track tagged write I/Os. In at least one embodiment, the cache or caching layer can track information about the tagged write I/Os, where the information can include a volume, offset and length corresponding to each tracked write I/O. The volume, offset and length can correspond to a target address or location of the write I/O to which data or content is written by the write I/O. At a later point in time in at least one embodiment, the information or metadata can be requested and collected for all tagged or tracked write I/Os. Processing can then include synchronizing the content of the locations of the tracked writes of V1 and V2 configured as the stretched volume.

In at least one embodiment, the foregoing tracking of write I/Os can be used in connection with the techniques of the present disclosure to provide a solution to create identical snapshots of volumes on sites or systems A and B without performing a quiesce and drain of I/Os directed to such volumes.

In at least one embodiment for a stretched volume configured from a volume pair V1, V2 where V1 is on the system A and V2 is on the system B, the caching layer on each system can track tagged write I/Os directed to the particular volume of the pair on the system. Prior to taking a first instance of snapshots of V1 and V2, write I/O completion or acknowledgements can be withheld temporarily by the data storage systems A and B even though the storage systems have completed servicing such write I/Os. After the write I/O acknowledgments are withheld on systems A and B, write I/Os directed to the stretched volume can be tagged with system-local tracking identifiers (IDs) (sometimes referred to herein simply as tracking IDs). In at least one embodiment, a unique tracking ID on a system can be specified for a combination of a particular identical snapshot request or command, a particular volume and a particular snapshot instance to be created of the particular volume. Thus within a data storage system in at least one embodiment, the tracking ID can be used to uniquely tag, identify and track write I/Os corresponding to a particular snapshot of a particular volume for a particular identical snapshot request or command.

In at least one embodiment, after write I/O acknowledgements are withheld across the systems A and B, processing can be performed to commence write I/O tracking and also take or create snap1 V1 (denoting a snapshot of V1) and snap1 V2 (denoting a snapshot of V2). The write I/O tracking performed captures the host write I/Os that are directed to the stretched volume and are received during the time period while the snapshots snap V1 and snap V2 are being created. In at least one embodiment, ID1 can denote the tracking ID corresponding to snap1 V1 on system A, and ID2 can denote the tracking ID corresponding to snap1 V2 on system B. In at least one embodiment, the system A can atomically perform the following operations or tasks: take snap1 V1 and commence write I/O tracking of write I/Os tagged with ID1. In at least one embodiment, the system B can atomically perform the following operations or tasks: take snap1 V2 and commence write I/O tracking of write I/Os tagged with ID2. In at least one embodiment, the foregoing operations can be performed atomically by each system so as to ensure capturing and tracking all host write I/Os received during the time period while the snapshots snap1 V1 and snap1 V2 are taken.

In at least one embodiment, after snap1 V1 and snap1 V2 are taken or created, write tracking of write I/Os directed to the stretched volume (e.g., V1 and V2) can stop. In particular, the system A can stop write I/O tracking of write I/Os tagged with ID1; and the system B can stop write I/O tracking of write I/Os tagged with ID2. At this point, the first version of the snapshots snap1 V1 and snap1 V2 can be incomplete and not yet identical.

In at least one embodiment, once write tracking is stopped, processing can be performed to collect information about the tracked write I/Os and determine a complete set of write I/Os that occurred during the time period while the snapshots snap1 V1 and snap1 V2 are being created. In connection with one-way replication configurations in at least one embodiment, the complete set of tracked write I/Os are those of the source system with respect to the replication configuration. The source system can be the single one of the systems A and B to which a host can issue I/Os directed to the stretched volume. In connection with a metro configuration in at least one embodiment, the complete set of tracked write I/Os includes tracked write I/Os from both the systems A and B since a host can issue I/Os directed to the stretched volume to both systems A and B.

In at least one embodiment, the operation to create the identical snapshots of V1 and V2 can be generally initiated from one of the systems A and B that can also drive or control the workflow processing. In at least one embodiment with a one-way replication configuration, the source system can initiate the operation to create the identical snapshots. In at least one embodiment with a metro configuration, either system A or B can initiate the operation to create the identical snapshots.

In at least one embodiment where the system A initiated the operation to create the identical snapshots of V1 and V2, the system A can collect the information or metadata regarding the complete set of tracked write I/Os to determine the particular offsets or locations of V1 corresponding to the tracked write I/Os. For example in at least one embodiment, the information or metadata of the complete set of tracked write I/Os can identify the logical block addresses or offsets (LBAs) modified or written to by the tracked write I/Os. The modified or written LBAs can denote the locations of the data changes extracted from snap1 V1, where such data changes are read from snap1 V1, replicated to system B, and applied or written to snap1 V2 on system B. For example, if the modified or written LBAs of the complete set of tracked write I/Os are 1, 5 and 20, content located at LBAs 1, 5 and 20 can be read from snap1 V1 of system A, replicated to system B, and then applied or written to snap1 V2 of system B.

In at least one embodiment, after the data changes corresponding to the tracked writes are replicated from system A to system B and applied to the snap1 V2, snap1 V1 and snap1 V2 are identical snapshots. The new set of identical snapshots snap1 V1 and snap1 V2 can now be further utilized. For example in at least one embodiment, if the request to create the identical snapshots is a user initiated request, the identical snapshots can be exposed externally to the user. As another example in at least one embodiment, if the request to create the identical snapshots is a data storage system internal request, the identical snapshots can be used for data storage system internal tasks or operations. For example, the data storage system internal request can be a request to create identical snapshots used as recovery snapshots to thereby provide a common base for subsequent use in any desired recovery operations. In at least one embodiment, recovery snapshots can be leveraged to determine the write operations that might not have been replicated at the time of any fault in the sites A and B, or in the replication network link therebetween. For example, assume an existing replication session fails or stops because site B was unavailable and site A continued to service storage clients using its V1 copy of the stretched volume. At a later point in time, site B is again available and online. As part of re-establishing the replication session, V2 of site B needs to be synchronized with V1 of site A. Prior to site B going offline, identical recovery snapshots of V1 and V2 (e.g., snap1 V1 and snap1 V2) may have been created as part of a schedule of periodically taking identical recovery snapshots of V1 and V2 in an ongoing manner. Now when site B comes back online at a second point in time, a second snapshot of V1, snap2 V1, can be taken. A snapshot difference between the two snapshots, snap1 V1 and snap2 V1, of site A can be used to synchronize the missing writes of V2 on site B which was unavailable or offline due to a fault causing the replication failure. Put another way, the snapshot difference between snap1 V1 and snap2 V1 denotes the missing writes to be applied to V2 of site B, where the missing writes are those that occurred during the time when site B was unavailable.

In at least one embodiment, a stretched volume can generally denote a single stretched storage resource or object configured from two local storage resources, objects or copies, respectively, on the two different sites or storage systems A and B, where the local two storage resources are configured to have the same identity as presented to a host or other external client. Sometimes, a stretched volume can also be referred to herein as a metro volume. More generally, sometimes a stretched storage resource or object can be referred to herein as a metro storage object or resource.

In at least one embodiment, a stretched resource or object can be any one of a set of defined resource types including one or more of: a volume, a logical device; a file; a file system; a sub-volume portion; a virtual volume used by a virtual machine; a portion of a virtual volume used by a virtual machine; a portion of a file system; a directory of files; and/or a portion of a directory of files. Thus although the techniques of the present disclosure can be described herein with reference to stretched volumes or logical devices, the techniques of the present disclosure can more generally be applied for use in connection with any suitable stretched resource or object.

In at least one embodiment, a storage object group or resource group construct can also be utilized where the group can denote a logically defined grouping of one or more storage objects or resources. In particular, a stretched or metro volume group can denote a logically defined grouping of one or more stretched volumes. More generally, a stretched or metro storage resource group or object group can denote a logically defined grouping of one or more stretched objects or resources.

The foregoing group construct of resources or objects can be used for any suitable purpose depending on the particular functionality and services supported for the group. For example in at least one embodiment, data protection can be supported at the group level such as in connection with snapshots. Taking a snapshot of the group can include taking a snapshot of each of the members at the same point in time. The group level snapshot can provide for taking a snapshot of all group members and providing for write order consistency among all snapshots of group members.

An application executed on a host can use such group constructs to create consistent write-ordered snapshots across all volumes, storage resources or storage objects in the group. Applications that require disaster tolerance can use the metro configuration with a volume group to have higher availability. Consistent with other discussion herein, such a volume group of metro or stretched volumes can sometimes be referred to as a metro volume group or metro group.

In at least one embodiment, metro volume groups can be used to maintain and preserve write consistency and dependency across all stretched or metro LUNs or volumes which are members of the metro volume group. Thus, write consistency can be maintained across, and with respect to, all stretched volumes or LUNs (or more generally all resources or objects) of the metro volume group whereby, for example, all members of the metro volume group denote copies of data with respect to a same point in time. In at least one embodiment, a snapshot can be taken of a metro volume group at the same particular point in time, where the group-level snapshot includes snapshots of all LUNs or volumes of the metro volume group across both sites or systems A and B where such snapshots of all LUNs or volumes are write order consistent. Thus such a metro volume group level snapshot of a metro volume group GP1 can denote a crash consistent and write order consistent copy of the stretched LUNs or volumes which are members of the metro volume group GP1. To further illustrate, a first write W1 can write to a first stretched volume or LUN 10 of GP1 at a first point in time. Subsequently at a second point in time, a second write W2 can write to a second stretched volume or LUN 11 of GP1 at the second point in time. A metro volume group snapshot of GP1 taken at a third point in time immediately after completing the second write W2 at the second point in time can include both W1 and W2 to maintain and preserve the write order dependency as between W1 and W2. For example, the metro volume group snapshot of GP1 at the third point in time would not include W2 without also including W1 since this would violate the write order consistency of the metro volume group. Thus, to maintain write consistency of the metro volume group, a snapshot is taken at the same point in time across all volumes, LUNs or other resources or objects of the metro volume group to keep the point-in-time image write order consistent for the entire group.

In at least one embodiment for stretched resources in a metro configuration, an operation to create identical snapshots can initiated from either the preferred or non-preferred site or system.

Figure 6:
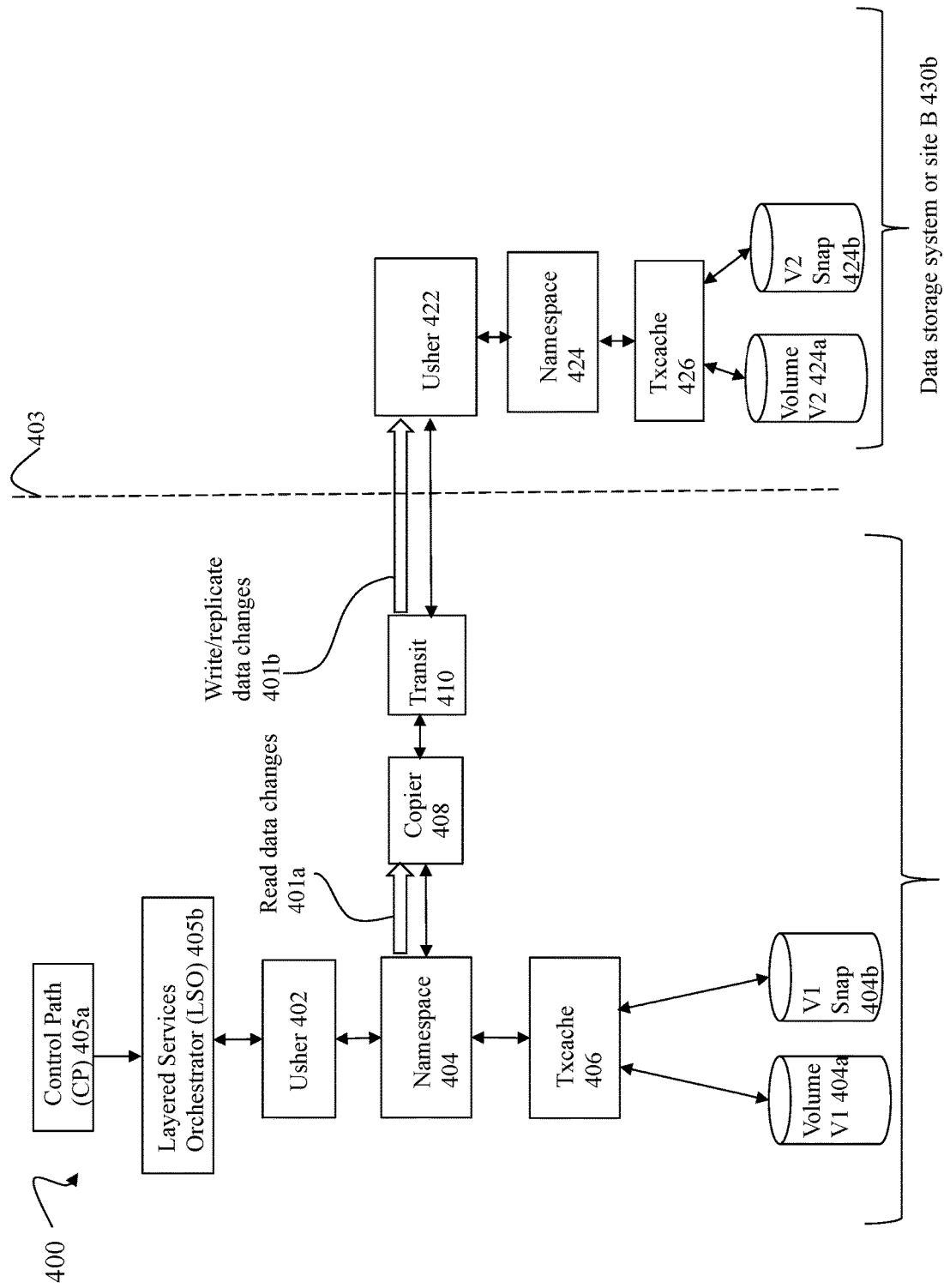
FIG. 6 is an example illustrating components that can be used in at least one embodiment in accordance with the techniques of the present disclosure.
Figure 7B:
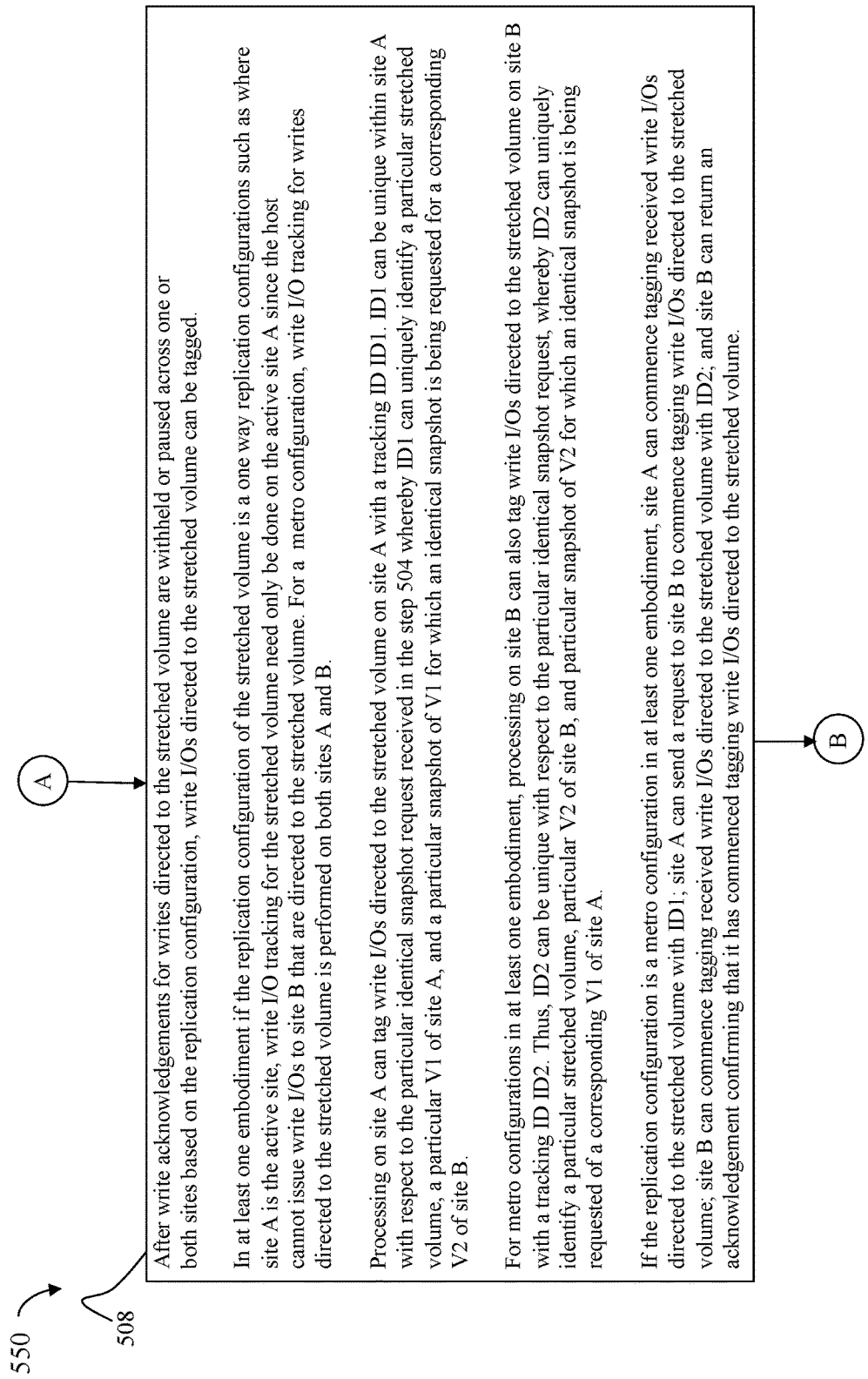

Referring to FIG. 6, shown is an example 400 of components in at least one embodiment in accordance with the techniques of the present disclosure.

In at least one embodiment, the components of FIG. 6 can be used in connection with the techniques of the present disclosure to create identical snapshots 404b, 424b respectively, of a first volume V1 404a and a second volume V2 424a, where V1 404a and V2 424a are both configured with the same identity as the same stretched volume when presented to an external storage client such as an external host.

The example 400 includes a first data storage system or site A 430a and a second data storage system or site B 430b. Components to the left of line 403 can be included in the system or site A 430a and components to the right of the line 403 can be included in the system or site B 430b. Consistent with other discussion herein, the first volume V1 404a and second volume V2 424a can be configured as a stretched volume or LUN having the same volume or LUN identity when exposed over paths to an external host such that the host views the pair of volumes, (V1 404a, V2 424a) as the same logical volume or LUN, such as LUN A. Generally in at least one embodiment, V1 404a and V2 424a can be included in any suitable replication configuration such as any of the replication configurations described herein. Thus, the volume V1 404a and volume V2 424a can be configured as a stretched volume or LUN having the same volume or LUN identity when exposed over paths to an external host such that the host views the pair of volumes, (V1 404a, V2 424a) as the same logical volume or LUN, such as LUN A.

In at least one embodiment, the replication configuration of the volumes 404a, 424a can be a one-way asynchronous or synchronous replication configuration such as described, for example, in connection with FIG. 4. For the foregoing one-way asynchronous or one-way synchronous replication configuration, data replication can include replicating writes to the stretched volume, that are received at the system 430a and applied to V1 404a, to the system 430b, where the replicated writes can be applied to the volume V2 424a.

In at least one embodiment, the replication configuration of the volumes 404a, 424a can be a metro configuration with two-way bidirectional synchronous replication such as described, for example, in connection with FIG. 5. For the foregoing two-way synchronous replication or metro configuration, data replication can include: replicating writes to the stretched volume, that are received at the system 430a and applied to V1 404a, to the system 430b, where the replicated writes can be applied to the volume V2 424a; and replicating writes to the stretched volume, that are received at the system 430b and applied to V2 424a, to the system 430a, where the replicated writes can be applied to the volume V1 404a.

The system A 430a can include the following components used in at least one embodiment in accordance with the techniques of the present disclosure: control path (CP) 405a, layered services orchestrator (LSO) 405b, usher 402, namespace 404, Txcache 406, copier 408, transit 410, volume V1 404a and snapshot 404b which is a snapshot of V1 404a. In at least one embodiment, LSO 405b, usher 402, namespace 404, copier 408, transit 410 and Txcache 406 can be included in the I/O or data path of the system A 430a. In at least one embodiment, namespace 404 and Txcache 406 can be included in a set of components referred to as core data path components used to generally read and write data locally on the system A 430a.

The system B 430b can include the following components used in at least one embodiment in accordance with the techniques of the present disclosure: usher 422, namespace 424, Txcache 426, volume V2 424a and snapshot 424b which is a snapshot of V2 424a. In at least one embodiment, usher 422, namespace 424 and Txcache 426 can be included in the I/O or data path of the system B 430b. In at least one embodiment, namespace 424 and Txcache 426 can be included in a set of components referred to as core data path components used to generally read and write data locally on the system B 430b.

Embodiments can include other components than those illustrated herein. It should be noted that if the volumes V1 404a and V2 424a are included in a replication configuration of a stretched volume or LUN that is a metro configuration (e.g., FIG. 5), the system 430b can also include additional components, such an instance of a copier 408 and transit 410, used in connection with replicating writes directed to the stretched volume or LUN that are received at system 430b and then replicated to system 430a for application to V2 424a.

In at least one embodiment, the copier 408 and transit 410 of the system 430a can be used in connection with the general or typical ongoing replication of writes or data changes from the system 430a to 430b, where such data changes can include host writes that are directed to the stretched LUN, received at the system 430a, replicated from the system 430a to 430b, and then applied to volume 424a. Additionally as discussed elsewhere in at least one embodiment of the techniques of the present disclosure, the copier 408 and transit 410 of the system 430a can be used in replicating or writing data changes comprising the tracked write I/Os used to create identical snapshots 404b, 424b, where the tracked writes I/Os are tracked during the time period when a first version of the snapshots 404b, 424b are created. At a later point in time, content of snapshots 404b, 424b can be synchronized to be identical by: selecting a particular one of the snapshots 404b, 424b on one of the systems 430a-b as a master copy such as by selecting 404b as the master copy; extracting content from the master copy at locations corresponding to the tracked write I/Os where the extracted content denotes a set of data changes; replicating the set of data changes corresponding to the locations of the tracked write I/Os to the remote system; and applying the data changes to the remaining one of the snapshots 404b, 424b not selected as the master copy.

In at least one embodiment, instances of usher 402, 422 can generally be I/O handlers respectively of the systems 430a-b. Instances of namespace 404, 424 can be LVMs or logical volume managers respectively of the systems 430a-b. Instances of Txcache 406, 426 can be cache managers or caching layers respectively of the systems 430a-b. Copier 408 can generally control the copying of data changes from the system 430a to the system 430b. Such data changes copied by copier 408 can include replicated writes for the replication configuration of volumes 404a, 424a. Such data changes copied by the copier 408 can include tracked writes tracked in accordance with the techniques of the present disclosure as part of processing performed as discussed elsewhere herein to create identical snapshots 404b and 424b, where snapshot 404b is a snapshot of V1 404a and where snapshot 424b is a snapshot of V2 424a.

In at least one embodiment, the control path such as denoted by CP 405a can generally control and orchestrate replication performed by a replication configuration. In at least one embodiment, the control path, such as CP 405a, can instruct the data path components to perform other operations or tasks such as to create identical snapshots of volume pairs (e.g., 404a, 424a) configured for replication.

In at least one embodiment, the data path, such as the data path caching component Txcache, can record or track information about tagged write I/Os. At a later point in time, processing can be performed in accordance with the techniques of the present disclosure to request the information collected about the tracked tagged write I/Os for the purpose of creating identical snapshots 404b and 424b, respectively, of volumes 404a and 424a. The tracked write I/Os can be captured during a time period when a first version of snapshots 404b, 424b are created on the systems 430a-b. Subsequently, the tracked write I/Os can denote the data changes that are applied to the first version of snapshots 404b, 424b to generate a second version of snapshots 404b, 424b, where the second version of the snapshots 404b, 424b are identical. In at least one embodiment, the data changes comprising the tracked writes can be extracted from V1 snap 404b, where 404b is selected as the master copy. Subsequently, the data changes comprising the tracked writes can be read (401a), copied or replicated (401b) from the system 430a to the system 430b, and then written or applied to the V2 snap 424b.

In at least one embodiment, namespace components 404, 424 can provide interfaces for reading and writing data. The namespace components 404, 424 can be logical volume managers or LVMs that export or provide access to volumes, maintain snapshots, and the like.

In at least one embodiment, the copier component 408 can query the namespace component 404 and thus the Txcache 406 for metadata or information, including LBAs or locations, of the set of tracked write I/Os denoting the set of data changes or writes made to the configured stretched volume pair (V1 404a, V2 424a) during the time period while the first version of the snapshots 404b, 424b of the volumes pair 404a, 404b are taken. The tracked writes denoting the data changes can be returned to the copier 408 thereby identifying regions or logical addresses of changed data that need to be read and then written or replicated to the system 430b. In a similar manner in a metro configuration, the namespace 424 and Txcache 426 can be queried for information or metadata regarding tracked write I/Os tracked by site B 430b, where such metadata can be returned to the site A 430a for consolidation or aggregation with metadata regarding tracked writes tracked by site A 430a.

In at least one embodiment where V1 snap 404b is selected as the master copy, copier 408 can read 401a the data changes via requests or calls to namespace 404. The data changes read can correspond to content of 404b stored at the locations of the set of tracked write I/Os. The data changes or content of the set of tracked write I/Os can be extracted or read (401a) from V1 snap 404b, written or replicated (401b) from site A to site B, and then applied to the V2 snap 424b thereby resulting in identical snapshots 404b, 424b. Copier 408 can provide the data changes read to the transit component 410 that writes or replicates 401b the data changes to the system 430b. In this example 400, the replicated data changes 401b can be received by usher 422 that can apply or write the data changes to the V2 snapshot (snap) 424b via write operations or requests issued to namespace 424.

Although the example 400 describes processing where site A controls or drives the processing and where V2 snap 404b is selected as the master copy, the techniques of the present disclosure can also be used in connection with having site B control or drive processing and where snap 424b is selected as the master copy.

What will now be described are additional details regarding the techniques of the disclosure in at least one embodiment.

Referring to FIGS. 7A-7E, shown is a flowchart 500, 550, 570, and 590 of processing steps that can be performed in at least one embodiment in accordance with the techniques of the present disclosure.

At the step 502, processing can be performed to configure a replication configuration for a stretched volume LUN A from a volume pair (V1, V2), where V1 is on site A and V2 is on site B, and where V1 and V2 are configured to have the same identity as LUN A when presented to an external storage client such as a host.

In at least one embodiment, the replication configuration can be any of: one way asynchronous replication with site A as the active or source site and site B as the passive or destination site; one way synchronous replication with site A as the active or source site and site B as the passive or destination site; or a metro configuration with two way synchronous replication. With one way replication configurations, the host can issue I/Os to the stretched volume or LUN over paths to the active or source site; and where the host cannot issue I/Os to the stretched volume or LUN over paths to destination or passive site. With the metro configuration, the host can issue I/Os to the stretched volume over paths to both sites A and B.

Additionally, an active replication session is established for the stretched volume based on the replication configuration. In this manner, one or more hosts can send writes to any of the sites A and B in accordance with the particular replication configuration. Subsequent steps of FIGS. 7A-E can be performed while one or more hosts issue write I/Os to any of the sites A and B in accordance with the replication configuration, and where such writes are also automatically replicating in an ongoing manner in accordance with the replication configuration. From the step 502, control proceeds to the step 504.

At the step 504, an instruction, command or request to create identical snapshots of V1 and V2 can be received by the control path (CP) of site A. Site A receiving the request to create the identical snapshots can control, coordinate and drive processing to create the identical snapshot of V1 and V2. The create identical snapshot request can identify the particular stretched volume for which identical snapshots are requested from the stretched volume's volume pair (V1, V2). In at least one embodiment where the replication configuration is a metro configuration, site A can be the preferred system or site, and site B can be the non-preferred system or site. From the step 504, control proceeds to the step 506.

At the step 506, the LSO component of site A can coordinate holding write I/O completion or acknowledgements for writes directed to the stretched volume across the sites A and B.

If the replication configuration of the stretched volume is a one way replication configurations such as where site A is the active site, write I/O acknowledgements for the stretched volume only need to be held on the active site A since the host cannot issue write I/Os to site B that are directed to the stretched volume.

If the replication configuration of the stretched volume is a metro configuration with two way synchronous replication, write I/O acknowledgements for the stretched volume are held or paused on both sites A and B. Holding such write I/O completions guarantees a crash consistent image across V1 and V2 configured as the stretched volume. For the metro configuration, site A can coordinate holding or pausing write I/O acknowledgements to the stretched volume. In particular in at least one embodiment, site A can withhold or pause sending write I/O acknowledgements directed to the stretched volume; site A can send a request to site B to withhold or pause sending write I/O acknowledgement directed to the stretched volume; site B can pause or withhold write I/O acknowledgements directed to the stretched volume; and site B can return an acknowledgement to site A indicating or confirming that site B has implemented the request to withhold write I/O acknowledgements for writes directed to the stretched volume. From the step 506, control proceeds to the step 508.

At the step 508, after write acknowledgements for writes directed to the stretched volume are withheld or paused across one or both sites based on the replication configuration, write I/Os directed to the stretched volume can be tagged.

In at least one embodiment if the replication configuration of the stretched volume is a one way replication configurations such as where site A is the active site, write I/O tracking for the stretched volume need only be done on the active site A since the host cannot issue write I/Os to site B that are directed to the stretched volume. For a metro configuration, write I/O tracking for writes directed to the stretched volume is performed on both sites A and B.

Processing on site A can tag write I/Os directed to the stretched volume on site A with a tracking ID ID1. ID1 can be unique within site A with respect to the particular identical snapshot request received in the step 504 whereby ID1 can uniquely identify a particular stretched volume, a particular V1 of site A, and a particular snapshot of V1 for which an identical snapshot is being requested for a corresponding V2 of site B.

For metro configurations in at least one embodiment, processing on site B can also tag write I/Os directed to the stretched volume on site B with a tracking ID ID2. Thus, ID2 can be unique with respect to the particular identical snapshot request, whereby ID2 can uniquely identify a particular stretched volume, particular V2 of site B, and particular snapshot of V2 for which an identical snapshot is being requested of a corresponding V1 of site A.

If the replication configuration is a metro configuration in at least one embodiment, site A can commence tagging received write I/Os directed to the stretched volume with ID1; site A can send a request to site B to commence tagging write I/Os directed to the stretched volume; site B can commence tagging received write I/Os directed to the stretched volume with ID2; and site B can return an acknowledgement confirming that it has commenced tagging write I/Os directed to the stretched volume. From the step 508, control proceeds to the step 510.

At the step 510, after write acknowledgements for writes directed to the stretched volume are withheld or paused across one or both sites based on the replication configuration and also after write I/O tagging is commenced across one or both sites based on the replication configuration, processing can be performed to commence write tracking for write I/Os directed to the stretched volume and also to create or take snapshots of V1 and V2 corresponding to the stretched volume. In at least one embodiment for one way replication configurations where A is the active site, write I/O tagging for the stretched volume need only be performed on site A. For a metro configuration, write I/O tagging of writes directed to the stretched volume is performed on both sites A and B.

Site A can commence tracking write I/Os that are tagged with ID1 and directed to the stretched volume and thus V1. Site A can also take or create V1 snap 404b, the snapshot of V1. In at least one embodiment, creating the snapshot of V1 and commencing/starting to track write I/Os with ID1 for V1 can be performed atomically as a single operation at the cache level by Txcache 406 within site A since the cache (e.g., Txcache 406) is tracking the writes with ID1.

Once site A has taken its snapshot of V1 and commenced tracking write I/Os with ID1, site A can send a request to site B. In at least one embodiment for one way replication configurations where site A is the active site, the request can be for site B to create a snapshot of V2. For a metro configuration, the request can be for site B to commence write I/O tracking for the stretched volume and also to take a snapshot of V2. In at least one embodiment for a metro configuration, creating the snapshot of V2, V2 snap 424b, and commencing/starting to track write I/Os with ID2 for V2 can be performed atomically as a single operation at the cache level by Txcache 426 within site B since the cache (e.g., Txcache 426) is tracking the writes with ID2.

Once site B has completed the requested processing of taking the snapshot of V2 and, for metro configurations also commencing write tracking for the stretched volume, site B can return an acknowledgement to site A confirming that the snapshot of V2 has been created. From the step 510, control proceeds to the step 512.

At the step 512, after snapshots of V1 and V2 are taken or created, tracking of writes directed to the stretched volume can stop.

For one way replication configurations with site A as the active site such that write tracking was only commenced for site A, write tracking for the stretched volume only needs to be stopped on site A.

For a metro configuration, write tracking for the stretched volume is stopped on both sites A and B. Site A can 1) stop tracking writes tagged with ID1 directed to the stretched volume (and thus V1); and 2) send a request to site B to stop tracking writes directed to the stretched volume. In response to receiving the request to stop tracking writes, site B can 1) stop tracking writes tagged with ID2 directed to the stretched volume (and thus V2); and 2) send an acknowledgement to site A that site B has stopped tracking writes for the stretched volume. From the step 512, control proceeds to the step 514.

At the step 514, after tracking of writes directed to the stretched volume is stopped on one or both sites based on the replication configuration, processing can be performed to resume acknowledging host writes directed to the stretched volume.

For a one way replication configuration with site A as the active site, resuming such write acknowledgements only needs to be restarted or resumed on site A.

For a metro configuration, resuming such write acknowledgements is performed on both sites A and B. Site A can 1) resume returning to hosts acknowledgement of writes directed to the stretched volume (and thus V1); and 2) send a request to site B to also resume returning acknowledgements for writes directed to the stretched volume (and thus V1). In response to receiving the request to resume write acknowledgements, site B can 1) resume returning acknowledgements for writes tagged with ID2 directed to the stretched volume (and thus V2); and 2) send an acknowledgement to site A that site B has resumed acknowledgement of writes for the stretched volume. From the step 514, control proceeds to the step 516.

At the step 516, after resuming acknowledgement of writes directed to the stretched volume, processing can determine a set of tracked write I/Os tracked for the stretched volume. The set denotes the tracked writes of the stretched volume that occurred during the time period while creating or taking the snapshots of V1 and V2 in the step 510.

For one way replication configurations, the set of tracked writes are those tracked by the active site such as site A.

For a metro configuration, the set of tracked writes are those tracked by both sites A and B. In at least one embodiment, site A (that received the request to create identical snapshots) can obtain the tracked writes for site A, obtain the tracked writes from site B, and determine the set of tracked writes by aggregating or combining the tracked writes from both sites A and B. From the step 516, control proceeds to the step 518.

At the step 518, a set of locations or LBAs corresponding to the target locations written to by the set of tracked writes can be determined. In at least one embodiment, the locations or LBAs of the tracked writes can be included in metadata or information recorded for the tracked writes by the caching layers, such as Txcache 406, 426. From the step 518, control proceeds to the step 520.

At the step 520, one of the created snapshots, V1 snap 404b or V2 snap 424b, is selected as a master copy to be used for synchronizing content of the snapshots 404b, 424b corresponding to the set of locations or LBAs of the target locations written to by the set of tracked writes. In at least one embodiment, snap 404b can be selected as the master copy. The data or content located at the set of locations or LBAs can form the data changes replicated to the remote site B and applied to V2 snap 424b to thereby result in snapshots 404b and 424b now being identical.

Processing can include obtaining the data changes by reading content for the set of LBAs from the selected master copy snapshot 404b, replicating the data changes from site A to site B, and applying the data changes at corresponding LBAs to the snapshot 424b. For example, assume the set or locations or LBAs written to by the set of tracked writes is 1, 5 and 10; and that V1 snap 404b is selected as the master copy. Site A can read content for LBAs 1, 5 and 10 from V1 snap 404b where such content for LBAs 1, 5 and 10 form the data changes. The data changes can be replicated from site A to site B, and then applied by site B to corresponding LBAs 1, 5 and 10 of V2 snap 424b. From the step 520, control proceeds to the step 522.

At the step 522, once the data changes corresponding to the set of locations written to by the set of tracked writes have been applied to V2 snap 424b, V1 snap 404b and V2 snap 424b are identical snapshots. From the step 522, control proceeds to the step 524.

At the step 524, the LSO component of site A can return the newly created set of identical snapshots 404b, 424b to the CP of site A for further processing and use.

Consistent with discussion herein in at least one embodiment, the LSO component can orchestrate, drive and/or coordinate processing to create the identical snapshots V1, V2 of a configured stretched volume. In at least one embodiment, the LSO component can issue instructions, for example, such as when to start and stop tracking write I/Os.

In connection with the techniques of the present disclosure in at least one embodiment, there is an active replication session in progress for the stretched volume configured from volume V1 of site A and volume V2 of site B. A request can be received to create identical snapshots of V1 and V2. The snapshots can be user or client snapshots exposed externally to a user or client outside the data storage systems. The snapshots can also be recovery snapshots or other snapshots used internally in the data storage system for performing data storage tasks or operations and where such snapshots are not exposed to a user or client. The request can be from a user to create identical snapshots exposed to the user. The request can be generated by the data storage system as part of performing various data storage system tasks or services. For example, the request can be a request to create recovery snapshots of V1 and V2 that can be used for data recovery and synchronization.

In at least one embodiment as discussed herein, the techniques of the present disclosure can include the systems or sites A and B holding or pausing write I/O completion or acknowledgement but allow newly received I/Os to proceed. Holding or pausing acknowledgement of a write can be performed by a system, such as system or site A and system or site B, where the particular system has completed servicing the write I/O but holds or pauses return an acknowledgement to the host or other client that issued the write regarding completion of the write. In at least one embodiment, such write I/Os for which acknowledgments are paused or stopped can be queued on the system. At a later point in time in processing of the techniques of the present disclosure when write acknowledgements are resumed, the queued write acknowledgements can be returned to the host or other external storage client that issued the write I/O now being acknowledged as completed.

In at least one embodiment and within a system or site, a tracking ID can be unique per request to create identical snapshots of V1 and V2 for a stretched volume. Thus, the tracking ID can be unique per volume or LUN for which a particular identical snapshot instance is to be taken. Put another way, the tracking ID on a system, such as site A, can be unique for a particular command or request to create the identical snapshots, a particular stretched volume, and a particular snapshot instance being created on the system such as the snapshot created from the local resource of volume V1. Incoming write I/Os directed to a volume can be tagged with the volume's unique tracking ID. For example, assume V1 of site A has tracking ID 200. All writes received at site A that are directed to the stretched volume, and thus V1, can be tagged with the ID 200 within the data path on site A. In at least one embodiment, the tracking ID in a system can be used to subsequently aggregate and sort/identify relevant write I/Os applied to a particular snapshot of a particular volume. Thus the tracking ID can be characterized as identifying a unique combination of both a particular volume and a particular snapshot of the particular volume.

In at least one embodiment, the tracking IDs used can be locally unique within a single system or site. Thus for V1, V2 configured as a stretched volume, V1 can have an associated tracking ID=ID1 on site A; and V2 can have an associated tracking ID=ID2 on site B.

In at least one embodiment as discussed above, write I/O tracking can be stopped when both sites A and B have created snapshots of V1 and V2, respectively.

In at least one embodiment, processing can query the cache layer or component, such as Txcache of a particular system, for the set of tracked writes directed to the stretched volume. In a metro configuration, LSO of the controlling or driving site such as site A can communicate with the remote system, such as site B, to obtain the tracked writes directed to the stretched volume that are tracked by site B.

Processing as discussed above such as in connection with FIGS. 7A-7E is described with reference to a single stretched volume. More generally, the techniques of the present disclosure can be used in connection with any suitable stretched resource.

Also in at least one embodiment, a logical group construct can be supported where the group is a defined set of one or more stretched volumes or resources. In at least one embodiment, the group can include multiple stretched volumes or resources each configured with a first local volume or resource on site A and a second volume or resource on site B, where both the first and second volumes or local resources are configured to have the same identity when exposed to an external host or other storage client. In such an embodiment, the techniques of the present disclosure can also be applied to create identical snapshots of volumes or resources of the group. To further illustrate, consider a metro volume group that is a group of two stretched LUNs, LUN A and LUN B, in a metro configuration, where LUN A is configured from V1 of site A and V2 of site B, and where LUN B is configured from V3 of site A and V4 of site B. V1 and V2 are configured to have the same identity of LUN A; and V3 and V4 are configured to have the same identity of LUN B. The techniques of the present disclosure can be used to issue a command to create identical snapshots of the group of stretched volumes such that processing creates a first snapshot of V1 and a second snapshot of V2 where the foregoing first and second snapshots are identical; and such that processing creates a third snapshot of V3 a fourth snapshot of V4 where the foregoing third and fourth snapshots are identical.

With groups of stretched volumes, each volume in the group can have its own unique tracking ID on each of the sites A and B. With groups, the step 506 of holding write I/O completion can be performed across all volumes of the group. Thus in at least one embodiment, processing does not proceed from step 506 to the step 508 until write I/O completion or acknowledgements are held or paused for all volumes of the group across both sites A and B. In connection with the step 510, snapshots can be taken for all volumes of the group. For each volume or local resource of the group in at least one embodiment, commencing write I/O tracking for the volume or local resource and taking the snapshot of the volume or local resource can be performed atomically. With a group, the tracking of writes in the step 512 does not stop until snapshots are created for all volumes of the group across the sites A and B. With a group, the acknowledgement of writes does not resume in the step 514 until tracking of writes is stopped for all volumes in the group across the sites A and B. With a group in at least one embodiment, the set of tracked write I/Os for the group is not determined until the acknowledgement of writes is resumed for all volumes of the group across the sites A and B. With a group, the set of tracked write I/Os includes all tracked writes for all volumes of the group across sites A and B. In at least one embodiment with a group, one of the sites or systems A and B can be selected such that volumes of the group on that system can be used as the master copies of content for synchronizing content of pairs of configured local volumes or resources configured as stretched volumes or resources. For example, with a group including V1, V2, V3 and V4 for the stretched LUNs A and B noted above, site A can be selected such that the snapshot of V1 and snapshot of V3 are used as the master copies when synchronizing content for the LBAs of tracked writes.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:
1. A computer-implemented method comprising:
configuring a replication configuration including a first volume V1 of a first system and a second volume V2 of a second system, wherein V1 and V2 are configured as a stretched volume having a same identity when exposed to a host over paths from the first system and the second system;

establishing an active replication session for the stretched volume between V1 and V2 in accordance with the replication configuration;

sending first writes directed to the stretched volume from the host to one or more of the first system and the second system;

receiving a request to create identical snapshots for V1 and V2; and in response to receiving the request, performing first processing including:

holding write acknowledgements regarding completion of writes directed to the stretched volume, wherein each write acknowledgement held is associated with a corresponding write for which servicing has completed but for which said each write acknowledgement is temporarily held until write acknowledgments for the stretched volume are subsequently resumed at a later point in time;

after said holding write acknowledgements regarding completion of writes directed to the stretched volume, tracking writes directed to the stretched volume;

creating a first snapshot of V1 and a second snapshot of V2;

after said creating the first snapshot of V1 and the second snapshot of V2, stopping the tracking of writes directed to the stretched volume;

after said stopping the tracking of writes directed to the stretched volume, resuming, at the later point in time, write acknowledgements regarding completion of writes directed to the stretched volume;

determining, in accordance with said tracking, a set of tracked writes directed to the stretched volume;

determining a set of locations corresponding to the set of tracked writes;

selecting the first snapshot of V1 as a master copy;

determining data changes corresponding the set of locations from the master copy;

replicating the data changes from the first system to the second system; and applying the data changes to the second snapshot of V2.

2. The computer-implemented method of claim 1, wherein the set of tracked writes denotes writes directed to the stretched volume that are received at the first system and the second system during a time period when the first snapshot of V1 and the second snapshot of V2 are created.

3. The computer-implemented method of claim 1, wherein the replication configuration is a one-way replication configuration, where writes directed to the stretched volume are sent over first paths from the host to the first system and automatically replicated to the second system, and where the host does not send I/Os directed to the stretched volume to the second system.

4. The computer-implemented method of claim 3, wherein the one-way replication configuration provides for asynchronous replication of writes directed to the stretched volume from the first system to the second system.

5. The computer-implemented method of claim 3, wherein the one-way replication configuration provides for synchronous replication of writes directed to the stretched volume from the first system to the second system.

6. The computer-implemented method of claim 1, wherein the replication configuration is a two-way synchronous replication configuration, where writes directed to the stretched volume are sent over first paths from the host to the first system and automatically replicated to the second system, and where writes directed to the stretched volume are sent over second paths from the host to the second system and automatically replicated to the first system.

7. The computer-implemented method of claim 6, wherein said holding write acknowledgements regarding completion of writes directed to the stretched volume includes:

the first system holding write acknowledgements regarding completion of writes directed to V1; and the second system holding write acknowledgements regarding completion of writes directed to V2.

8. The computer-implemented method of claim 6, wherein said tracking writes directed to the stretched volume includes:

the first system tracking writes directed to V1; and the second system tracking writes directed to V2.

9. The computer-implemented method of claim 8, further comprising:

the first system tagging writes directed to the stretched volume with a first identifier corresponding to the request, the stretched volume, V1 and the first snapshot of V1; and the second system tagging writes directed to the stretched volume with a second identifier corresponding to the request, the stretched volume, V2 and the second snapshot of V2.

10. The computer-implemented method of claim 9, wherein the first system tracks writes directed to V1 by identifying writes tagged with the first identifier.

11. The computer-implemented method of claim 10, wherein the second system tracks writes directed to V2 by identifying writes tagged with the second identifier.

12. The computer-implemented method of claim 6, wherein said stopping tracking of writes directed to the stretched volume includes:

stopping tracking of writes directed to V1 on the first system; and stopping tracking of writes directed to V2 on the second system.

13. The computer-implemented method of claim 6, wherein said resuming write acknowledgements regarding completion of writes directed to the stretched volume includes:

the first system resuming write acknowledgments regarding completion of writes directed to V1; and the second system resuming write acknowledgments regarding completion of writes directed to V2.

14. The computer-implemented method of claim 6, wherein said determining the set of tracked writes directed to the stretched volume includes:

obtaining a first portion of tracked writes that are directed to the stretched volume and tracked by the first system;

obtaining a second portion of tracked writes that are directed to the stretched volume and tracked by the second system; and combining the first portion and the second portion to determine an aggregated set of tracked writes as the set of tracked writes.

15. The computer-implemented method of claim 14, wherein the set of locations includes logical offsets or locations written to by the aggregated set of tracked writes.

16. The computer-implemented method of claim 1, wherein the first processing is performed while the host sends the first writes directed to the stretched volume to any of the first system and the second system in accordance with replication configuration.

17. The computer-implemented method of claim 16, wherein the first processing is performed while the first writes directed to the stretched volume are replicated between the first system and the second system in accordance with the replication configuration.

18. One or more non-transitory computer readable media comprising code stored thereon that, when executed, perform a method comprising:
configuring a replication configuration including a first volume V1 of a first system and a second volume V2 of a second system, wherein V1 and V2 are configured as a stretched volume having a same identity when exposed to a host over paths from the first system and the second system;
establishing an active replication session for the stretched volume between V1 and V2 in accordance with the replication configuration;
sending first writes directed to the stretched volume from the host to one or more of the first system and the second system;
receiving a request to create identical snapshots for V1 and V2; and
in response to receiving the request, performing first processing including:
holding write acknowledgements regarding completion of writes directed to the stretched volume, wherein each write acknowledgement held is associated with a corresponding write for which servicing has completed but for which said each write acknowledgement is temporarily held until write acknowledgments for the stretched volume are subsequently resumed at a later point in time;
after said holding write acknowledgements regarding completion of writes directed to the stretched volume, tracking writes directed to the stretched volume;
creating a first snapshot of V1 and a second snapshot of V2;
after said creating the first snapshot of V1 and the second snapshot of V2, stopping the tracking of writes directed to the stretched volume;
after said stopping the tracking of writes directed to the stretched volume, resuming, at the later point in time, write acknowledgements regarding completion of writes directed to the stretched volume;
determining, in accordance with said tracking, a set of tracked writes directed to the stretched volume;
determining a set of locations corresponding to the set of tracked writes;
selecting the first snapshot of V1 as a master copy;
determining data changes corresponding the set of locations from the master copy;
replicating the data changes from the first system to the second system; and
applying the data changes to the second snapshot of V2.

19. A system comprising:
one or more processors; and
one or more memories comprising code stored therein that, when executed, performs a method comprising:
configuring a replication configuration for a group of a plurality of stretched resources, wherein each of the plurality of stretched resources is configured from a pair of corresponding resources R1, R2, wherein R1 is a first local resource of a first system and R2 is a second local resource of a second system, wherein R1 and R2 have a same identity when exposed to a host over paths from the first system and the second system;
establishing an active replication session for the group of stretched resources in accordance with the replication configuration;
sending first writes directed to the plurality of stretched resources of the group, wherein the first writes are sent from the host to one or more of the first system and the second system;
receiving a request to create identical snapshots for the group of the plurality of stretched resources;
in response to receiving the request, performing first processing including:
holding write acknowledgements regarding completion of writes directed to the plurality of stretched resources, wherein each write acknowledgement held is associated with a corresponding write for which servicing has completed but for which said each write acknowledgement is temporarily held until write acknowledgments for the plurality of stretched volumes are subsequently resumed at a later point in time;
after said holding write acknowledgements regarding completion of writes directed to the plurality of stretched resources, tracking writes directed to the plurality of stretched resources;
for each of the plurality of stretched resources configured from a corresponding first local resource of the first system and a corresponding second local resource of the second system, creating a first snapshot of the corresponding first local resource and a second snapshot of the corresponding second local resource;
after said creating for each of the plurality of stretched resources, stopping the tracking of writes directed to the plurality of stretched resources of the group;
after said stopping the tracking of writes directed to the plurality of stretched resources, resuming, at the later point in time, write acknowledgements regarding completion of writes directed to the plurality of stretched resources of the group;
determining, in accordance with said tracking, a set of tracked writes directed to the plurality of stretched resources of the group;
determining a set of locations corresponding to the set of tracked writes;
selecting the first snapshots of the corresponding first local resources of the first system corresponding to the plurality of stretched resources as a master copy of content;
determining data changes corresponding the set of locations from the master copy;
replicating the data changes from the first system to the second system; and
applying the data changes to the second snapshots of the corresponding second local resources of the second system corresponding to the plurality of stretched resources.

* * * * *